(12) United States Patent
Bang et al.

(10) Patent No.: US 10,080,029 B2
(45) Date of Patent: Sep. 18, 2018

(54) VIDEO ENCODING/DECODING METHOD AND APPARATUS

(71) Applicants: Electronics and Telecommunications Research Institute, Daejeon (KR); University-Industry Cooperation Group of Kyung Hee University, Yongin-si (KR)

(72) Inventors: Gun Bang, Daejeon (KR); Gwang Soon Lee, Daejeon (KR); Nam Ho Hur, Daejeon (KR); Gwang Hoon Park, Seongnam-si (KR); Young Su Heo, Suwon-si (KR); Kyung Yong Kim, Suwon-si (KR); Yoon Jin Lee, Yongin-si (KR)

(73) Assignees: ELECTRONICS AND TELECOMMUNICATIONS RESEARCH INSTITUTE, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 87 days.

(21) Appl. No.: 14/903,117

(22) PCT Filed: Apr. 22, 2014

(86) PCT No.: PCT/KR2014/003517
§ 371 (c)(1),
(2) Date: Jan. 6, 2016

(87) PCT Pub. No.: WO2015/060508
PCT Pub. Date: Apr. 30, 2015

(65) Prior Publication Data
US 2016/0381374 A1 Dec. 29, 2016

(30) Foreign Application Priority Data

Oct. 24, 2013 (KR) .................. 10-2013-0126852
Nov. 28, 2013 (KR) .................. 10-2013-0146600
Apr. 22, 2014 (KR) .................. 10-2014-0048066

(51) Int. Cl.
*H04N 11/02* (2006.01)
*H04N 19/51* (2014.01)
(Continued)

(52) U.S. Cl.
CPC ............. *H04N 19/51* (2014.11); *H04N 19/52* (2014.11); *H04N 19/597* (2014.11); *H04N 19/176* (2014.11)

(58) Field of Classification Search
CPC ..................................................... H04N 19/51
(Continued)

(56) References Cited

U.S. PATENT DOCUMENTS

2013/0170549 A1* 7/2013 Li ......................... H04N 19/52
375/240.16
2013/0176390 A1* 7/2013 Chen .................... H04N 19/597
348/43

(Continued)

FOREIGN PATENT DOCUMENTS

JP 2013-34187 2/2013
KR 10-2012-0080122 A 7/2012
(Continued)

OTHER PUBLICATIONS

Heo, Young Su, et al. "3D-CE3.h: Results on Simple Merge Candidate List Construction for 3DV (JCT3V-F0093)." *Joint Collaborative Team on 3D Video Coding Extensions of ITU-T SG 16 WP 3 and ISO/IEC JTC 1/SC 29/WG 11* (2013) (23 pages, in English).

(Continued)

*Primary Examiner* — Leron Beck
(74) *Attorney, Agent, or Firm* — NSIP Law

(57) ABSTRACT

Disclosed are a video encoding/decoding method and apparatus including a plurality of views. The video decoding method including the plurality of views comprises the steps
(Continued)

of: inducing basic combination motion candidates for a current Prediction Unit (PU) to configure a combination motion candidate list; inducing expanded combination motion candidates for the current PU when the current PU corresponds to a depth information map or a dependent view; and adding the expanded combination motion candidates to the combination motion candidate list.

12 Claims, 23 Drawing Sheets

(51) Int. Cl.
*H04N 19/597* (2014.01)
*H04N 19/52* (2014.01)
*H04N 19/176* (2014.01)

(58) Field of Classification Search
USPC .......................................... 375/240.01–240.29
See application file for complete search history.

(56) References Cited

U.S. PATENT DOCUMENTS

2013/0188715 A1* 7/2013 Seregin .................. H04N 19/52
375/240.16
2013/0188720 A1* 7/2013 Wang ............... H04N 19/00684
375/240.16
2013/0336405 A1* 12/2013 Chen .................... H04N 19/597
375/240.16

FOREIGN PATENT DOCUMENTS

| KR | 10-2013-0048122 A | 5/2013 | |
|---|---|---|---|
| KR | 10-2013-0085382 | 7/2013 | |
| WO | WO 2012/171442 A1 | 12/2012 | |
| WO | WO 2012171442 A1 * | 12/2012 | ........... H04N 19/597 |

OTHER PUBLICATIONS

International Search Report issued on Jul. 28, 2014 in counterpart International Application No. PCT/KR2014/003517 (5 pages, with English translation).
Bang, G., et al. "3D-CE3. h: Results on Simple Merge Candidate List Construction for 3DV." *JCT3V-F0093* (2013). (11 pages, in English).
Extended European Search Report dated May 2, 2017 in counterpart European Patent Application No. 14855443.9 (7 pages, in English).
Tech, Gerhard, et al. "3D-HEVC Draft Text 1." *Proceedings of the 5th Meeting of Joint Collaborative Team on 3D Video Coding Extensions (JCT-3V)*. 2013. (89 pages, in English).

* cited by examiner

FIG. 2
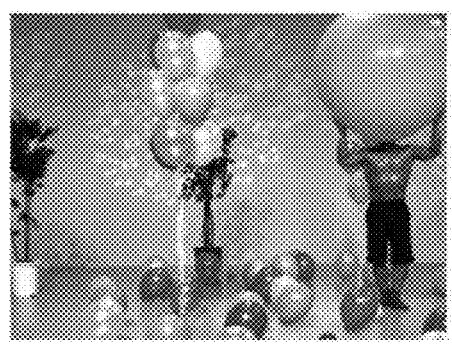
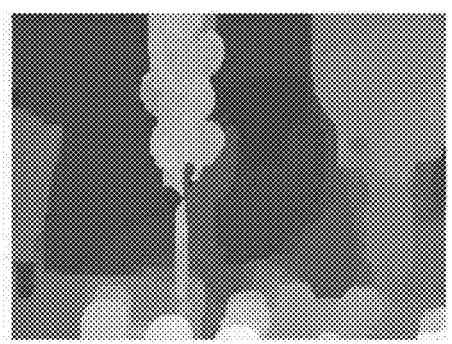
(a) Texture view　　　　　(b) Depth map

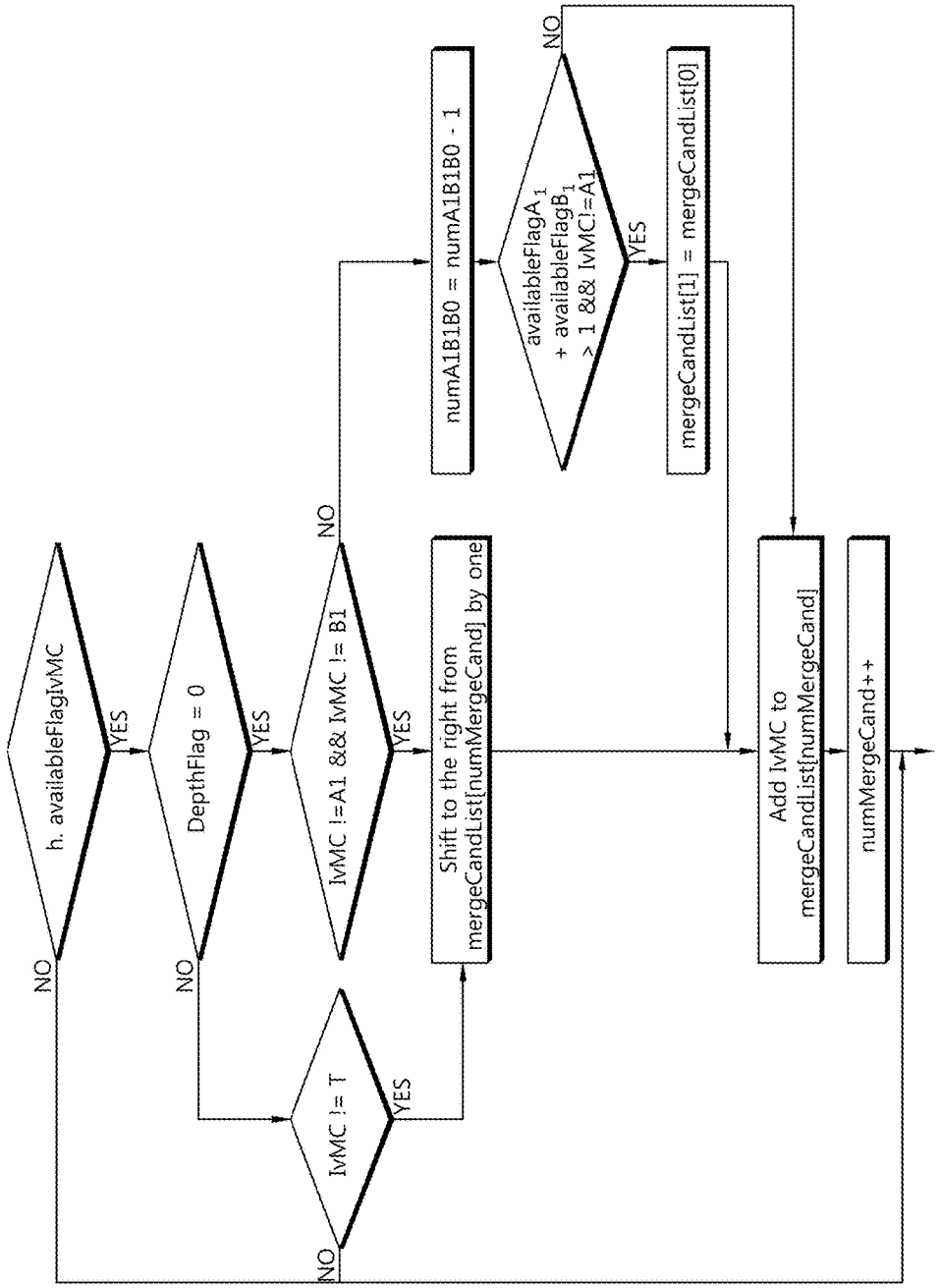

VIDEO ENCODING/DECODING METHOD AND APPARATUS

CROSS-REFERENCE TO RELATED APPLICATIONS

This application is a U.S. National Stage Application of International Application No. PCT/KR2014/003517, filed on Apr. 22, 2014, which claims the benefit under 35 USC 119(a) and 365(b) of Korean Patent Application No. 10-2013-0126852, filed on Oct. 24, 2013, Korean Patent Application No. 10-2013-0146600, filed on Nov. 28, 2013, and Korean Patent Application No. 10-2014-0048066, filed on Apr. 22, 2014 in the Korean Intellectual Property Office.

BACKGROUND OF THE INVENTION

Field of the Invention

The present invention is related to a method and an apparatus for video encoding/decoding and more particularly, a method and an apparatus for constructing a merge motion candidate list for three-dimensional (3D) video coding.

Related Art

Three-dimensional (3D) video provides a user with a vivid three-dimensional feeling through a 3D display device so that the user can see and feel the same as if in the real-world. Related to the 3D video, the Joint Collaborative Team on 3D Video Coding Extension Development (JCT-3V), which is a joint standardization group of ISO/IEC Moving Picture Experts Group (MPEG) and ITU-T Video Coding Experts Group (VCEG), is pursuing development of a 3D video standard. The 3D video standard includes an advanced data model and technical specifications related to the data model, based on which not only stereoscopic images but also auto-stereoscopic images can be played by using a texture view and its depth map information.

SUMMARY OF THE INVENTION

The present invention provides a method and an apparatus for video encoding/decoding which can improve video encoding/decoding efficiency.

The present invention provides a method and an apparatus for 3D video encoding/decoding which can improve encoding/decoding efficiency.

The present invention provides a method and an apparatus for constructing a merge motion candidate list at the time of 3D video encoding/decoding.

According to one embodiment of the present invention, a method for video decoding that supports a multi-view is provided. The video decoding method comprises constructing a merge motion candidate list by deriving a default merge motion candidate with respect to a current Prediction Unit (PU), deriving an extended merge motion candidate with respect to the current PU when the current PU is a depth map or a dependent view, and adding the extended merge motion candidate to the merge motion candidate list.

In the step of adding the extended merge motion candidate, the extended merge motion candidate can be added to the merge motion candidate list when the extended merge motion candidate is not the same as the default merge motion candidate within the merge motion candidate list.

According to another embodiment of the present invention, an apparatus for video decoding that supports a multi-view is provided. The video decoding apparatus comprises a default merge motion list construction module configured to construct a merge motion candidate list by deriving a default merge motion candidate with respect to a current Prediction Unit (PU), and an additional merge motion list construction module configured to derive an extended merge motion candidate with respect to the current PU when the current PU is a depth map or a dependent view and add the extended merge motion candidate to the merge motion candidate list.

The additional merge motion list construction module can add the extended merge motion candidate to the merge motion candidate list when the extended merge motion candidate is not the same as the default merge motion candidate within the merge motion candidate list.

According to a yet another embodiment of the present invention, a method for video encoding that supports a multi-view is provided. The video encoding method comprises constructing a merge motion candidate list by deriving a default merge motion candidate with respect to a current Prediction Unit (PU), deriving an extended merge motion candidate with respect to the current PU when the current PU is a depth map or a dependent view, and adding the extended merge motion candidate to the merge motion candidate list.

In the step of adding the extended merge motion candidate, the extended merge motion candidate can be added to the merge motion candidate list when the extended merge motion candidate is not the same as the default merge motion candidate within the merge motion candidate list.

According to a still another embodiment of the present invention, an apparatus for video encoding that supports a multi-view is provided. The video encoding apparatus comprises a default merge motion list construction module configured to construct a merge motion candidate list by deriving a default merge motion candidate with respect to a current Prediction Unit (PU), and an additional merge motion list construction module configured to derive an extended merge motion candidate with respect to the current PU when the current PU is a depth map or a dependent view and add the extended merge motion candidate to the merge motion candidate list.

The additional merge motion list construction module can add the extended merge motion candidate to the merge motion candidate list when the extended merge motion candidate is not the same as the default merge motion candidate within the merge motion candidate list.

A module used for encoding an ordinary video of an independent view (View 0), which provides backward compatibility, can be employed directly to an ordinary video of a dependent view (View 1 and View 2) and depth maps, and thus implementation complexity can be reduced.

Also, since a partial encoder is additionally applied to an ordinary video of a dependent view (View 1 and View 2) and depth maps, encoding efficiency can be improved.

BRIEF DESCRIPTION OF THE DRAWINGS

FIG. 2 shows a texture view of "balloons" and one example of the corresponding depth image.

FIGS. 17a to 17f are flow diagrams illustrating a method for adding extended merge motion candidates to a merge motion candidate list according to one embodiment of the present invention.

DESCRIPTION OF EXEMPLARY EMBODIMENTS

Hereinafter, embodiments of the present invention will be described in detail with reference to the accompanying drawings. In describing the embodiments of the present specification, when it is determined that the detailed description of the known art related to the present invention may obscure the gist of the present invention, the corresponding description thereof may be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the specification does not exclude a component other than the corresponding component and means that an additional component may be included in the embodiments of the present invention or the scope of the technical spirit of the present invention.

Terms such first, second, and the like may be used to describe various components, but the components are not limited by the terms. The above terms are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component includes respective components which are arranged for easy description and at least two components of the respective components may constitute one component or one component is divided into a plurality of components which may perform their functions. Even an integrated embodiment and separated embodiments of each component is also included in the scope of the present invention without departing from the spirit of the present invention.

Further, some components are not requisite components that perform essential functions but selective components for just improving performance in the present invention. The present invention may be implemented with the requisite component for implementing the spirit of the present invention other than the component used to just improve the performance and a structure including only the requisite component other than the selective component used to just improve the performance is also included in the scope of the present invention.

Figure 1:
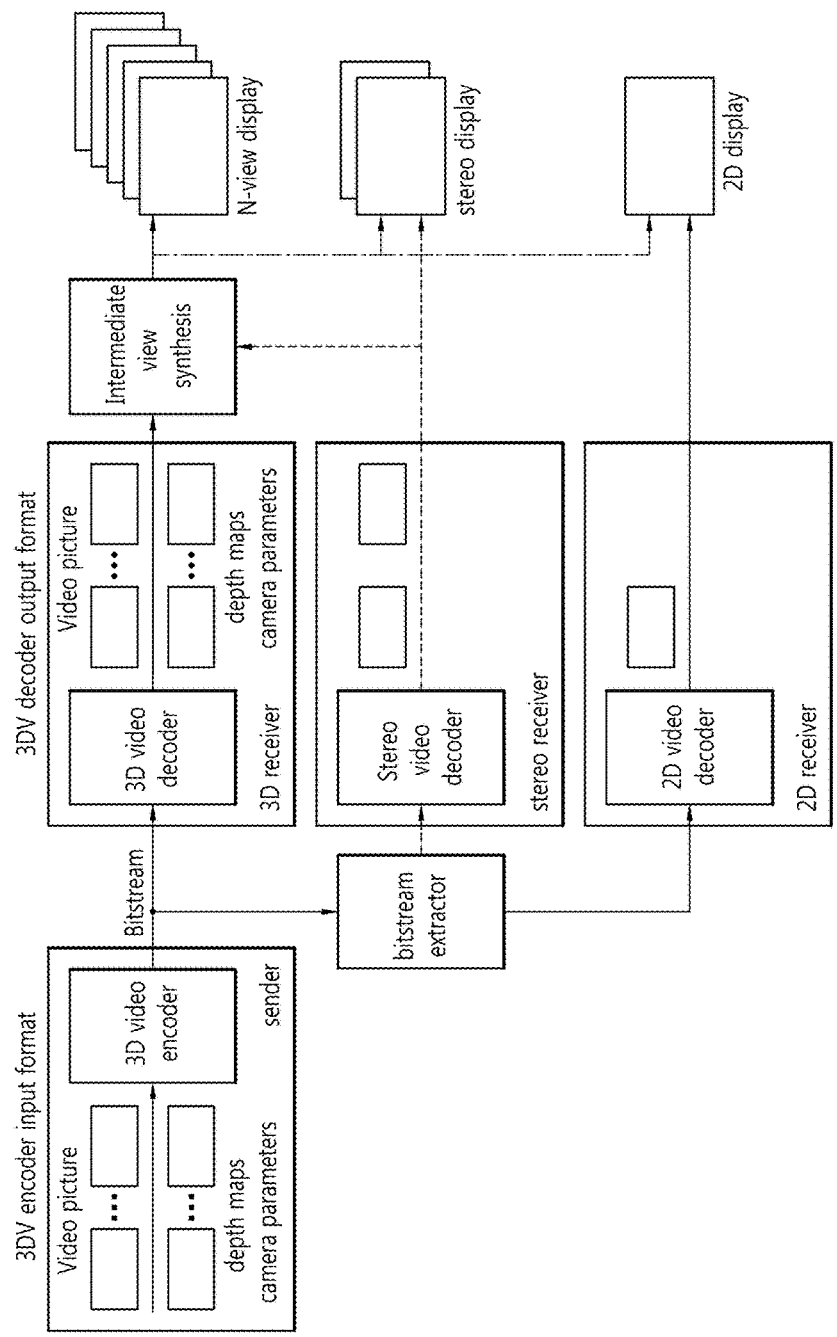
FIG. 1 is a brief illustration of a default structure and a data format of a 3D video system.

FIG. 1 is a brief illustration of a default structure and a data format of a 3D video system. The 3D video system of FIG. 1 can correspond to the basic 3D video system that is considered in the 3D video standard.

With reference to FIG. 1, the 3D Video (3DV) system can comprise a sender which generates multi-view video contents and a receiver which decodes the video contents received from the sender and provides a multi-view video.

The sender can generate video information by using a stereo camera and a multi-view camera and generate a depth map by using a depth camera. Also, the sender can convert a 2D video into a 3D video by using a converter. The sender can generate video contents providing N (N≥2) views by using the generated video information and depth map.

The N-view video contents can include N-view video information, the corresponding depth map information, camera-related auxiliary information, and so on. The N-view video contents can be compressed by a 3D video encoder by using a multi-view video encoding method, and the compressed video contents (bit streams) can be transmitted to a receiver-side device through a network.

The receiver can decode a received bit stream in a video decoder (for example, a 3D video decoder, stereo video decoder, 2D video decoder, and the like) by using a multi-view video decoding method and reconstruct the N-view video.

The reconstructed N-view video can consist of virtual viewpoint images of N or more viewpoints through a Depth-Image-Based Rendering (DIBR) process. The generated virtual viewpoint images of N or more viewpoints are reproduced to be fitted to various types of 3D display devices (for example, an N-view display, stereo display, 2D display, and the like), providing the user with images causing a sensation of depth.

FIG. 2 shows a texture view of "balloons" and one example of the corresponding depth image.

A depth map is used to generate a virtual viewpoint image, which represents distance between a camera and an actual object in the real-world (depth information at each pixel expressed in the same resolution of a photo image) by using a predetermined number of bits.

FIG. 2(a) shows a texture view of "balloons" adopted in the 3D video encoding standard of MPEG which is a Standards Development Organization (SDO). FIG. 2(b) is a depth map of the "balloons" image shown in FIG. 2(a). The depth map of FIG. 2(b) uses 8 bits per pixel to represent depth information as shown in the image.

A method for encoding an actual image and its corresponding depth map can use, for example, the MPEG-4 Part 10 Advanced Video Coding (H.264/AVC) standard or High Efficiency Video Coding (HEVC) international video standard jointly developed by the MPEG and VCEG Actual images and their depth maps can be obtained by a single or multiple cameras. Images acquired from multiple cameras can be encoded separately, where an ordinary 2D video codec can be used for this purpose. Also, since inter-view correlation exists among the images acquired from multiple cameras, the images acquired from multiple cameras can be encoded by using inter-view prediction to increase encoding efficiency.

Figure 3:
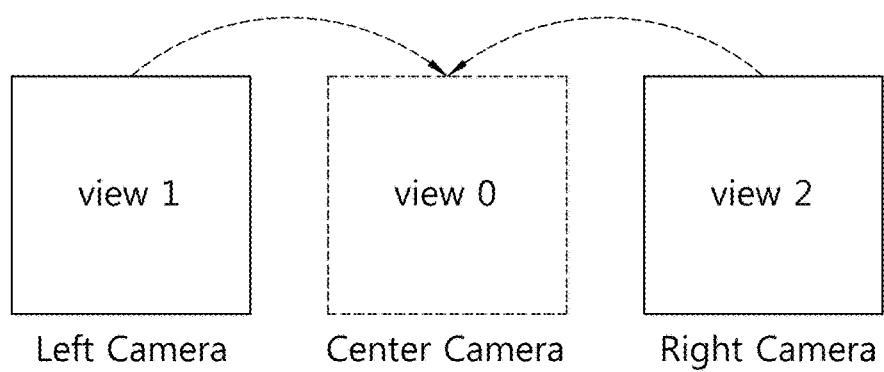
FIG. 3 is one example illustrating a structure of inter-view prediction in a 3D video codec.

FIG. 3 is one example illustrating a structure of inter-view prediction in a 3D video codec.

With reference to FIG. 3, View 1 represents an image acquired from the camera located in the left with respect to View 0 while View 2 represents an image acquired from the camera located in the right with respect to the View 0.

The View 1 and View 2 perform inter-view prediction by using the View 0 as a reference image, and an encoding order is such that the View 0 is encoded before the View 1 and View 2.

Since the View 0 can be encoded independently of the other views, it is called an independent view. On the other hand, since the View 1 and View 2 are encoded by using the View 0 as a reference image, the two views are called dependent views. The independent view image can be encoded by using an ordinary 2D video codec. Meanwhile, since dependent view images are required to perform inter-view prediction, they can be encoded by using a 3D video codec which includes an inter-view prediction process.

Also, in order to increase encoding efficiency of the View 1 and View 2, the View 1 and View 2 can be encoded by using a depth map. For example, when a texture view and its depth map are encoded, the texture view and the depth map can be encoded or decoded independently of each other. Similarly, when the texture view and its depth map are encoded, the texture view and the depth map can be encoded or decoded dependent on each other as shown in FIG. 4.

Figure 4:
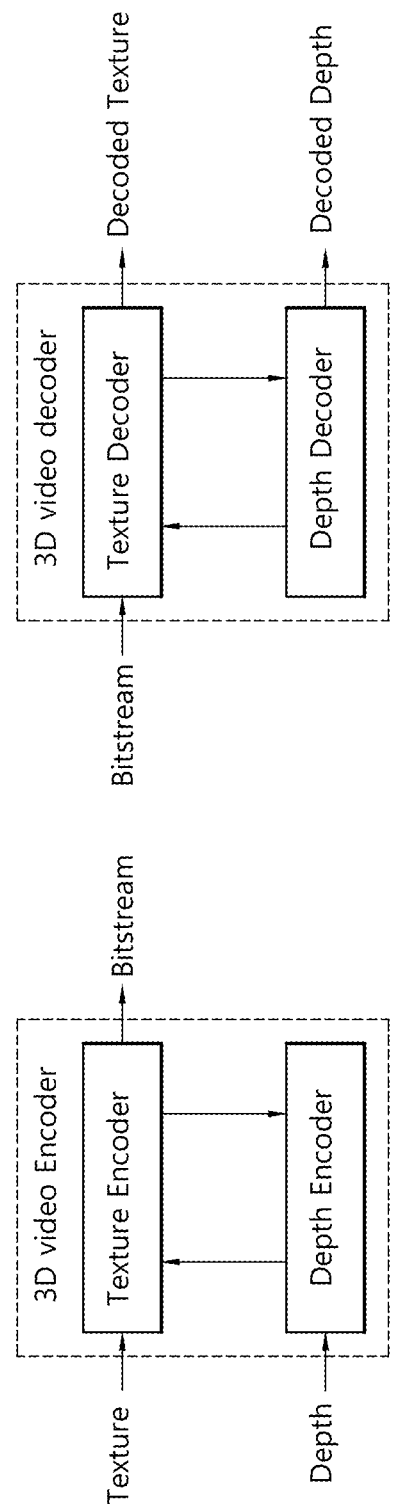
FIG. 4 is one example illustrating a procedure of encoding/decoding a texture view and a depth map in a 3D video encoder/decoder.

FIG. 4 is one example illustrating a procedure of encoding/decoding a texture view and a depth map in a 3D video encoder/decoder.

With reference to FIG. 4, a 3D video encoder can comprise a texture encoder which encodes a texture view and a depth encoder which encodes a depth view.

For example, the texture encoder can encode a texture view by using a depth map already encoded by the depth encoder. On the other hand, the depth encoder can encode the depth map by using the texture view already encoded by the texture encoder.

The 3D video decoder can comprise a texture decoder which decodes a texture view and a depth decoder which decodes a depth map.

For example, the texture decoder can decode a texture view by using a depth map already decoded by the depth decoder. On the other hand, the depth decoder can decode the depth map by using the texture view already decoded by the texture decoder.

Figure 5:
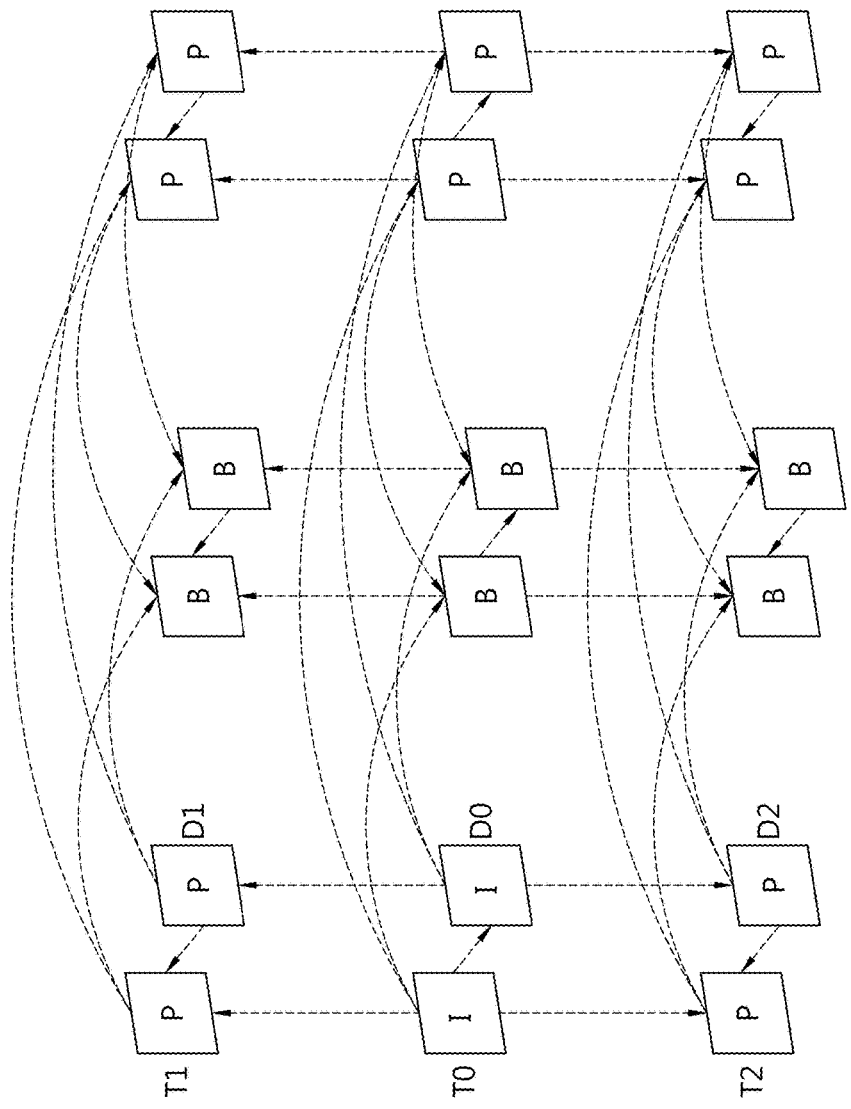
FIG. 5 is one example of a prediction structure of a 3D video codec.

FIG. 5 is one example of a prediction structure of a 3D video codec.

For the convenience of description, FIG. 5 illustrates a encoding prediction structure for encoding texture views acquired from three cameras and depth maps with respect to the texture views.

With reference to FIG. 5, the three texture views acquired from the three cameras are denoted by T0, T1, and T2 according to the respective views, and the three depth maps at the same positions of the texture views are denoted by D0, D1, and D2 depending on the respective views. At this time, T0 and D0 are images acquired from View 0; T1 and D1, from View 1; and T2 and D2, from View 2.

The rectangles of FIG. 5 represent images (pictures).

Each picture (picture) can be classified into Intra picture (I picture), uni-Prediction picture (P picture), and Bi-directional picture (B picture); and can be encoded according to the encoding type of the picture. I picture encodes an image itself without employing inter-picture prediction; P picture performs inter-picture prediction encoding by using forward prediction from reference pictures; and B picture performs inter-picture prediction encoding by using forward and backward prediction from reference images.

The arrows of FIG. 5 represent prediction direction. In other words, depending on a prediction direction, texture view and its corresponding depth map can be encoded or decoded being dependent on each other.

A method for estimating motion of a current block from a texture view can be classified largely into temporal prediction and inter-view prediction. Temporal prediction refers to a prediction method employing temporal correlation at the same viewpoint while inter-view prediction refers to a prediction method employing inter-view correlation between neighboring viewpoints. The temporal prediction and inter-view prediction can be used interchangeably within one picture.

At this time, a current block refers to the block within the texture view for which prediction is currently performed. Motion information may denote only a motion vector or a motion vector, reference picture number, uni-directional prediction, bi-directional prediction, inter-view prediction, temporal prediction, or other type of prediction.

Meanwhile, large volume 3D video contents need to be compressed in an efficient manner to reduce the amount of bit streams. To increase encoding efficiency, inter-view correlation can be utilized, or correlation between a texture view and its depth map can be utilized. To deal with the aforementioned element, more encoding algorithms are needed than for encoding 2D images, and hardware or software complexity in implementation is increased along with increased computational complexity.

Figure 6:
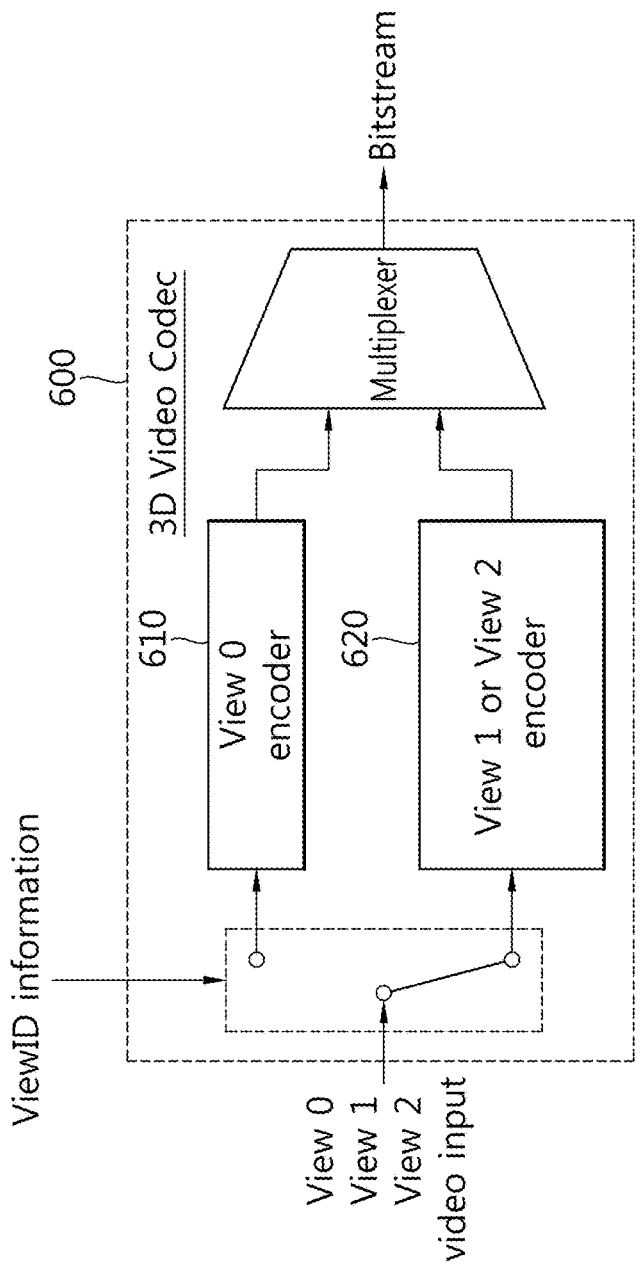
FIG. 6 is a diagram illustrating an encoder of a 3D video codec.

FIG. 6 is a diagram illustrating an encoder of a 3D video codec.

With reference to FIG. 6, a 3D video codec 600 receives and encodes images of different viewpoints (for example, View 0, View 1, and View 2), and outputs an integrated, encoded bit stream.

At this time, images can include not only a texture view but also a depth map.

The 3D video codec can encode input images by using different encoders according to view ID information.

For example, since an image from View 0 needs to be encoded by an existing 2D video codec for ensuring backward compatibility, a default layer encoder 610 (View 0 encoder) can be used to encode the image from View 0. Images from View 1 and View 2 need to be encoded by a 3D video codec including an inter-view prediction algorithm and an algorithm utilizing correlation between a texture view and its depth map; therefore, an enhancement layer encoder 620 (View 1 or View 2 encoder) can be used to encode the images of View 1 and View 2.

Also, in the case of a depth map rather than an texture view, encoded information of the texture view can be utilized for encoding, the enhancement layer encoder 620 can be used to encode the depth map. Therefore, different from the case of encoding View 0 images, a more complicated encoder is required to encode images from View 1 and View 2. Moreover, a lot more sophisticated encoder is needed to encode a depth map rather than for encoding a texture view in the base layer.

Meanwhile, an HEVC uses a merge motion method as one of methods for encoding motion information used for inter-prediction at the time of video encoding/decoding. At this time, to increase encoding efficiency in the enhancement layer, an enhanced merge motion method, which is obtained by modifying the merge motion method in the base layer, is used in the enhancement layer.

Figure 7:
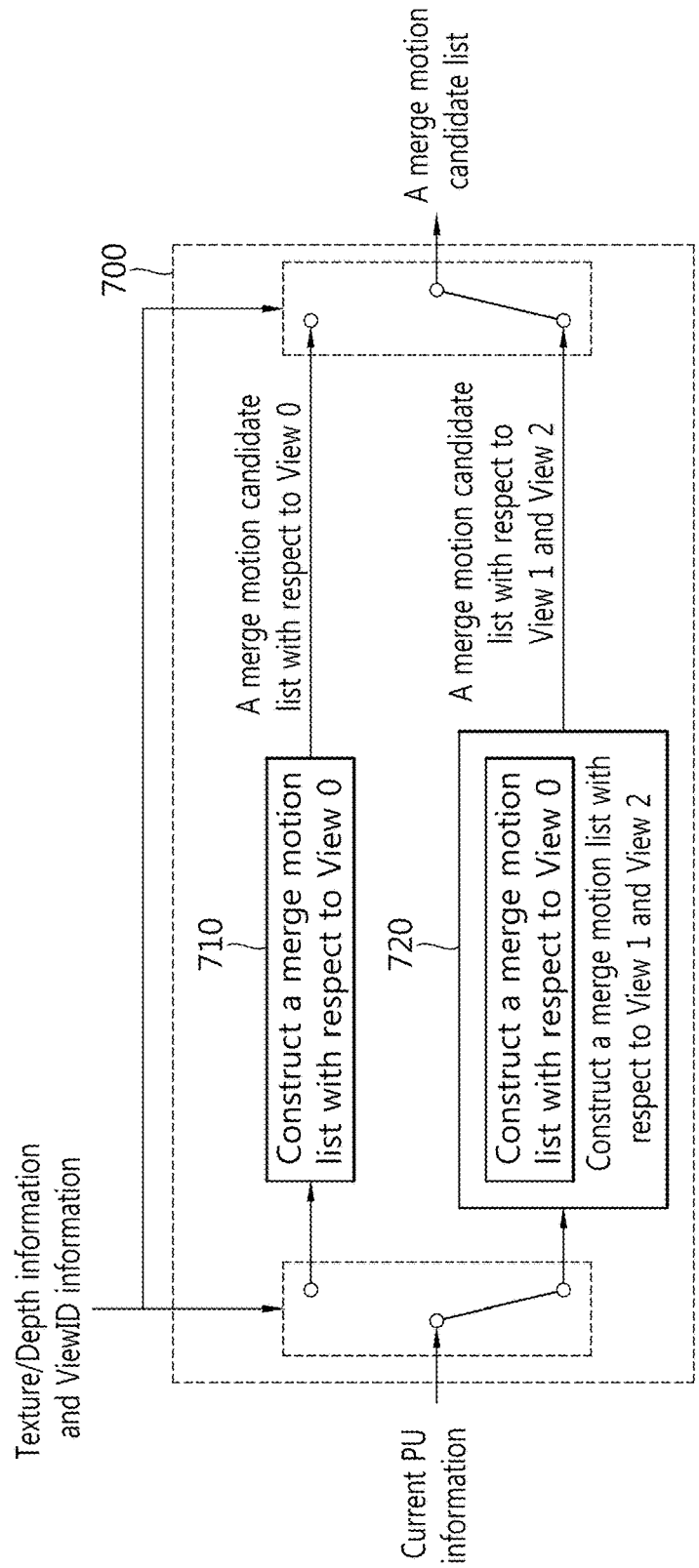
FIG. 7 illustrates a method for merge motion used in a 3D High Efficiency Video Coding (HEVC).

FIG. 7 illustrates a method for merge motion used in a 3D High Efficiency Video Coding (HEVC).

With reference to FIG. 7, the 3D-HEVC 700 applies a merge motion construction method 710 to View 0 separately from a merge motion construction method 720 to the other views (View 1 and View 2).

If an image containing a current Prediction Unit (PU), Prediction Block (PB), or a block of an arbitrary size is input to the 3D-HEVC 700, the 3D-HEVC 700 can choose either of the merge motion construction method 710 for the View 0 and the merge motion construction method 720 for the other views (View 1 and View 2), based on information about whether the input image is a texture view or a depth map and viewpoint information (ViewID information) of the input image. And the 3D-HEVC 700, by using the chosen method for constructing merge motion, can output a merge motion candidate list with respect to the current PU.

At this time, the current PU refers to a current block where prediction within a current image is carried out for encoding/decoding of the current image.

The texture image with respect to the View 0 constructs a merge motion candidate list by using a merge motion construction method for a base layer to ensure backward compatibility. On the other hand, the texture view and its depth map with respect to the View 1 and the View 2 construct a merge motion candidate list by using a merge motion construction method for the enhancement layer.

A merge motion construction method for the enhancement layer is carried out by adding a new candidate to the merge motion construction method for the base layer or modifying an order of the candidate list. In other words, as shown in FIG. 7, the merge motion construction method for the enhancement layer (for the other views (View 1 and View 2) and the corresponding depth maps) already includes the merge motion construction method for the base layer.

Therefore, the merge motion construction method for the enhancement layer is implemented in a more complicated manner and requires higher computational complexity than the merge motion construction method for the base layer. Also, in view of hardware or software implementation, since both of the merge motion construction method for the base layer and the merge motion construction method for the enhancement layer have to be implemented, implementation complexity is increased by more than double.

Figure 8:
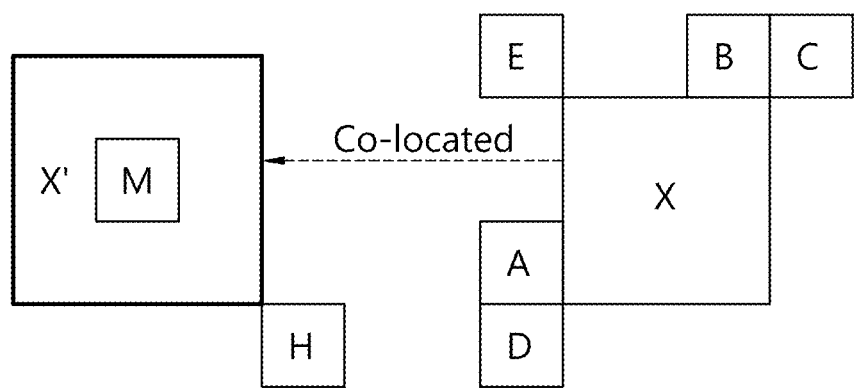
FIG. 8 is one example of peripheral blocks used to construct a merge motion list with respect to a current block.

FIG. 8 is one example of peripheral blocks used to construct a merge motion list with respect to a current block.

A merge motion method (merge mode) refers to a method for utilizing motion information of neighboring blocks of a current block as the motion information (for example, a motion vector, reference picture list, reference picture index, and so on) of the current block (current PU) and constructs a merge motion candidate list with respect to the current block based on the motion information of the neighboring blocks.

As shown in FIG. 8, the neighboring blocks can be defined as the blocks A, B, C, D, and E located spatially close to the current block and co-located block H or M temporally corresponding to the current block. The co-located block refers to the block within the co-located picture corresponding temporally to a current picture including the current block. If the H block within the co-located picture is available, the H block is determined to be a co-located block. Otherwise the M block within the co-located picture is determined to be a co-located block.

To construct a merge motion candidate list, it is determined first whether motion information of the neighboring blocks (A, B, C, D, and E) and the co-located block (H or M) can be used as a merge motion candidate which constitutes a merge motion candidate list of the current block. Next, motion information of available blocks is determined as a merge motion candidate. Then the merge motion candidate can be added to the merge motion candidate list.

Figure 9:
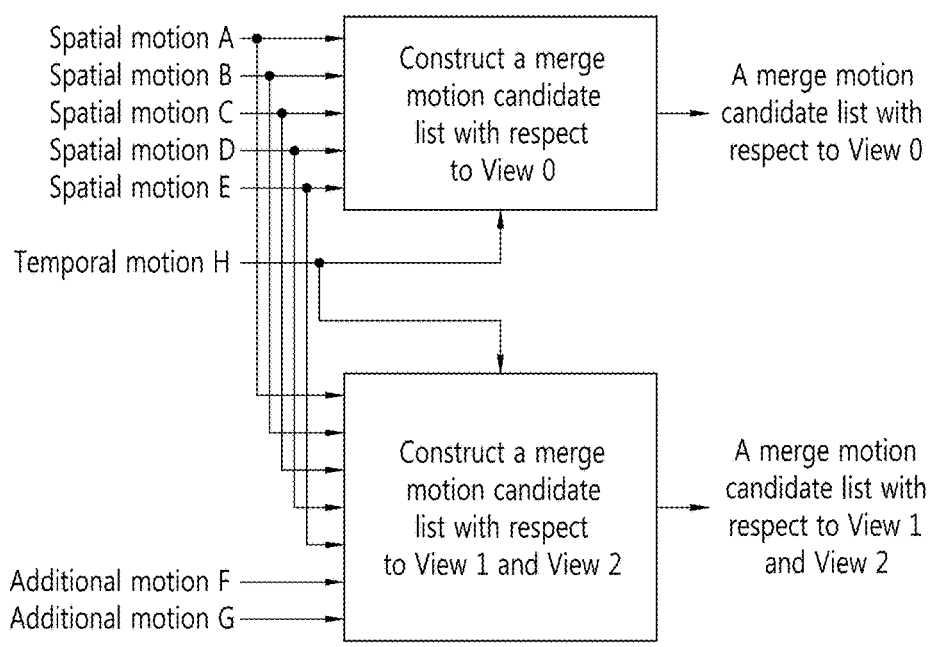
FIG. 9 is one example of a method for constructing a merge motion candidate list implemented by hardware.

FIG. 9 is one example of a method for constructing a merge motion candidate list implemented by hardware.

With reference to FIG. 9, an input parameter for constructing a merge motion list used in a texture view with respect to View 0 is the same as the input parameter for constructing a merge motion list used in a texture view and its depth map with respect to View 1 and View 2. The only difference is the fact that an input parameter ("additional motion F" and "additional motion G") for constructing a merge motion list used for a texture view and its depth map with respect to View 1 and View 2 is added.

Therefore, due to the additional motion information, those parts which constitute the merge motion candidate list are changed. In other words, to include the additional motion information in the merge motion candidate list (to increase encoding efficiency), a merge motion list construction module for a texture view and its depth map with respect to the View 1 and the View 2 has to be implemented anew. And this can lead to the increase of complexity of hardware implementation.

To solve the problems, the present invention proposes a method for reducing implementation complexity and computational complexity of an encoding algorithm and a video codec for the enhancement layer (in the embodiment, a texture view and its depth map with respect to the View 1 and the View 2). As one example, the present invention reuses a "merge motion candidate list construction" module for the base layer (a texture view with respect to the View 0), implementation of which has been already completed in the form of a hardware chip, to apply the module to the enhancement layer (in the embodiment, a texture view and its depth map with respect to the View 1 and the View 2), thereby reducing complexity of hardware implementation. According to the present invention, if a consumer having an encoder/decoder for the base layer used for a 2D video service (more specifically, the "merge motion candidate list construction" module) attempts to receive a 3D video service, he or she will be able to easily access the 3D video service only by attaching an additional module (to be specific, the "merge motion candidate list construction" module for the enhancement layer).

In what follows, described will be a method for increasing data processing throughput by reducing implementation complexity and computational complexity of a video codec according to the present invention.

[Basic Method]

Figure 10:
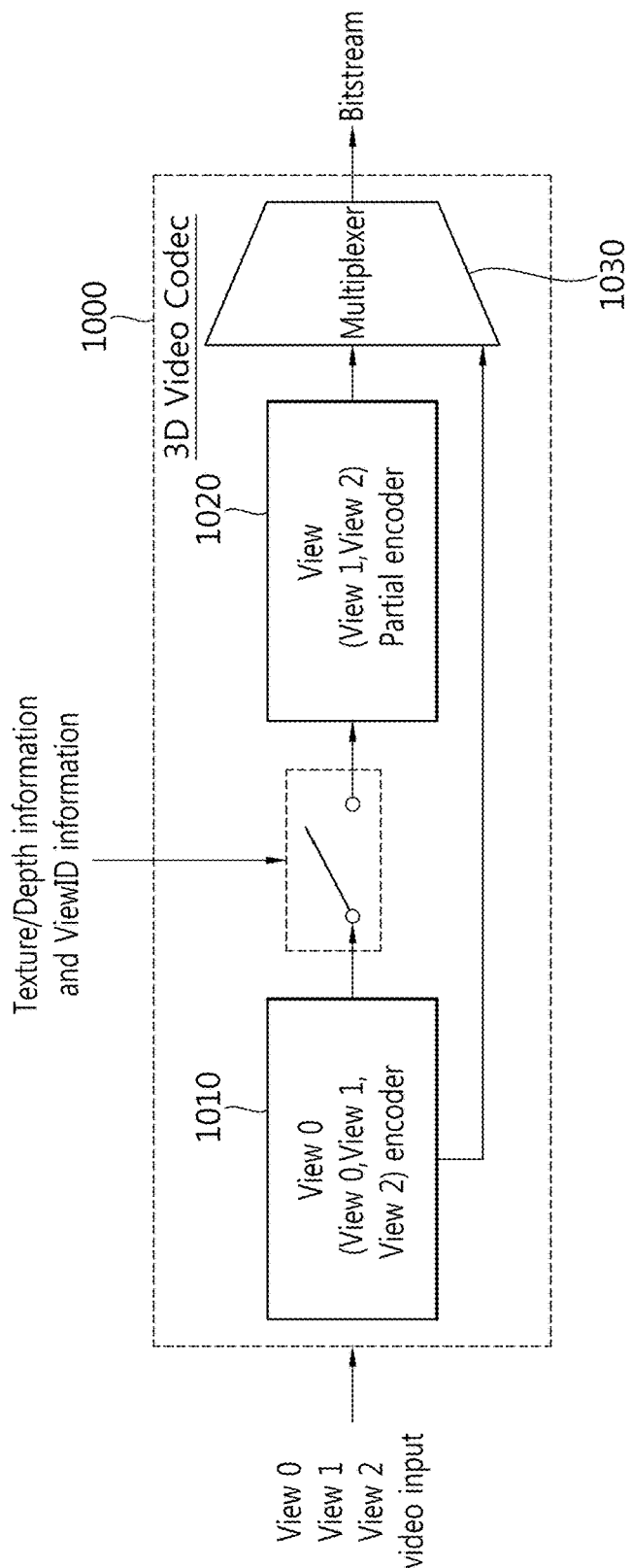
FIG. 10 illustrates a 3D video codec according to one embodiment of the present invention.

FIG. 10 illustrates a 3D video codec according to one embodiment of the present invention.

With reference to FIG. 10, a 3D video codec 1000 receives images at different viewpoints (for example, View 0, View 1, and View 2), encodes the received images, and outputs an encoded bit stream.

At this time, the images can include not only texture views but also the corresponding depth maps. Images can be classified into images of independent views which can be encoded independently of other viewpoints and images of dependent views which are encoded with reference to the images of independent views. For example, View 0 can be an independent view, and View 1 and View 2 can be dependent views encoded with reference to the View 0.

The 3D video codec 1000 can include an encoder 1010 which is capable of encoding a texture view and its depth map with respect to all of the viewpoints (for example, View 0, View 1, and View 2). For example, the encoder 1010 capable of encoding a texture view and its depth map with respect to all of the viewpoints can be implemented by MPEG-1, MPEG-2, MPEG-4 Part 2 Visual, H.264/AVC, VC-1, AVS, KTA, HEVC (H.265/HEVC), and so on.

The 3D video codec 1000 can include a partial encoder 1020 to increase encoding efficiency for a texture view and its depth map with respect to a dependent view rather than an independent view. For example, the partial encoder 1020 can encode a texture view and its depth map with respect to the View 1 and the View 2, or encode a depth map with respect to all of the viewpoints.

The 3D video codec 1000 can include a multiplexer 1030 which multiplexes images encoded by the respective encoders 1010, 1020. The multiplexer 1030 multiplexes a bit stream of a texture view with respect to the View 0 and a bit stream of texture views and the corresponding depth maps with respect to the View 1 and the View 2 into a single bit stream.

As described above, the 3D video codec 1000 according to one embodiment of the present invention can apply a module 1010 with backward compatibility, which is used to encode a texture view with respect to an independent view (for example, View 0), to texture views and the corresponding depth maps with respect to dependent views (for example, View 1 and View 2), thereby reducing implementation complexity. And the 3D video codec 1000 according to one embodiment of the present invention can increase encoding efficiency by applying the partial encoder 1020 to texture views and the corresponding depth maps with respect to dependent views (for example, View 1 and View 2).

The 3D video codec described in detail with reference to FIG. 10 can be applied to the entire encoding/decoding process or to the individual steps of the encoding/decoding process.

[Detailed Method]

Figure 11:
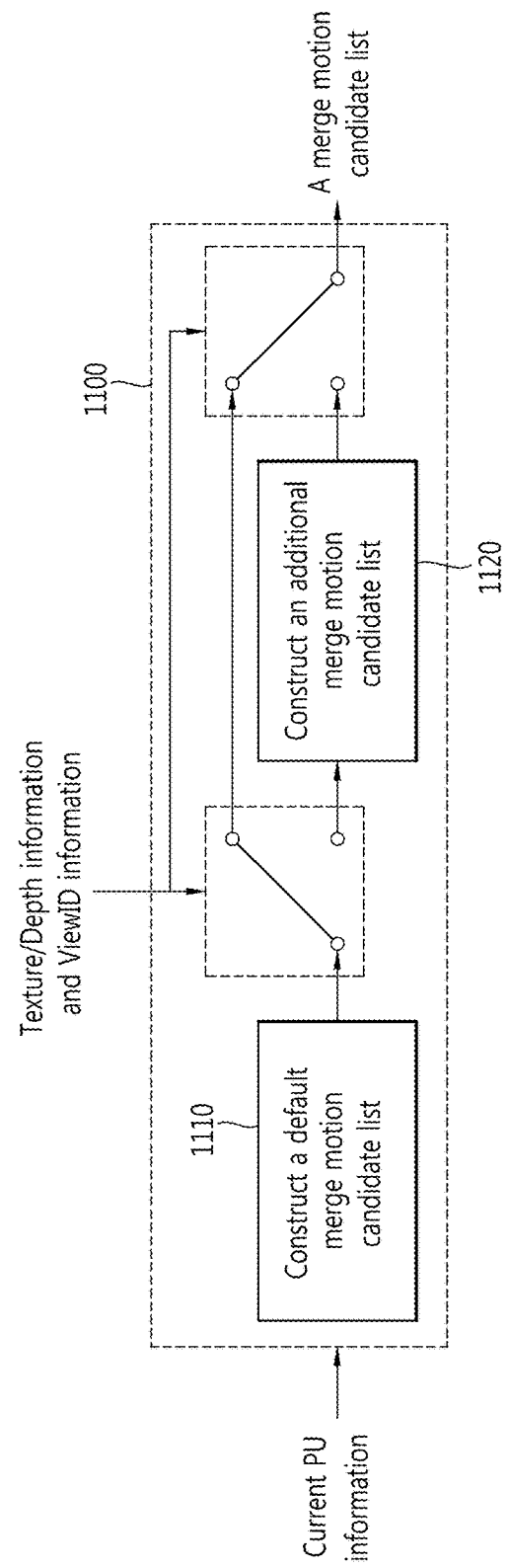
FIG. 11 is a conceptual diagram illustrating a method for merge motion according to one embodiment of the present invention.

FIG. 11 is a conceptual diagram illustrating a method for merge motion according to one embodiment of the present invention. The merge motion method illustrated in FIG. 11 can be carried out by a 3D-HEVC, where the 3D-HEVC can be implemented by using the 3D video codec of FIG. 10.

A merge motion method according to one embodiment of the present invention derives a spatial merge motion candidate and a temporal merge motion candidate with respect to a current PU, derives an additional merge motion candidate based on the information about the current PU (for example, viewpoint information of the current PU, image type information of the current PU, and so on), and constructs a merge motion candidate list with respect to the current PU based on the derived merge motion candidates.

With reference to FIG. 11, in a merge motion method according to one embodiment of the present invention, the input comprises current PU information (for current image information), information about whether the current PU image is a texture view or a depth map (texture/depth information), and viewpoint information of the current PU (ViewID information); and the output is a merge motion candidate list with respect to the current PU.

A merge motion method of the present invention carries out the "default merge motion list construction" step 1110 with respect to the current PU by default, producing a "default merge motion candidate list". As one example, the "default merge motion list construction" step 1110 can adopt the merge motion candidate list construction method of the HEVC.

Next, the merge motion method of the present invention can carry out an "additional merge motion list construction" step 1120 additionally according to information about whether the current PU image is a texture view or a depth map (texture/depth information) and viewpoint information of the current PU. At this time, in the "additional merge motion list construction" step 1120, the input is the "default merge motion candidate list" produced at the "default merge motion list construction" step 1110 and the output is an "extended merge motion candidate list". The "additional merge motion list construction" step 1120 can be carried out for texture views and the corresponding depth maps with respect to dependent views (for example, the View 1 and the View 2).

Further details about the merge motion method according to the present invention will be described below.

Figure 12:
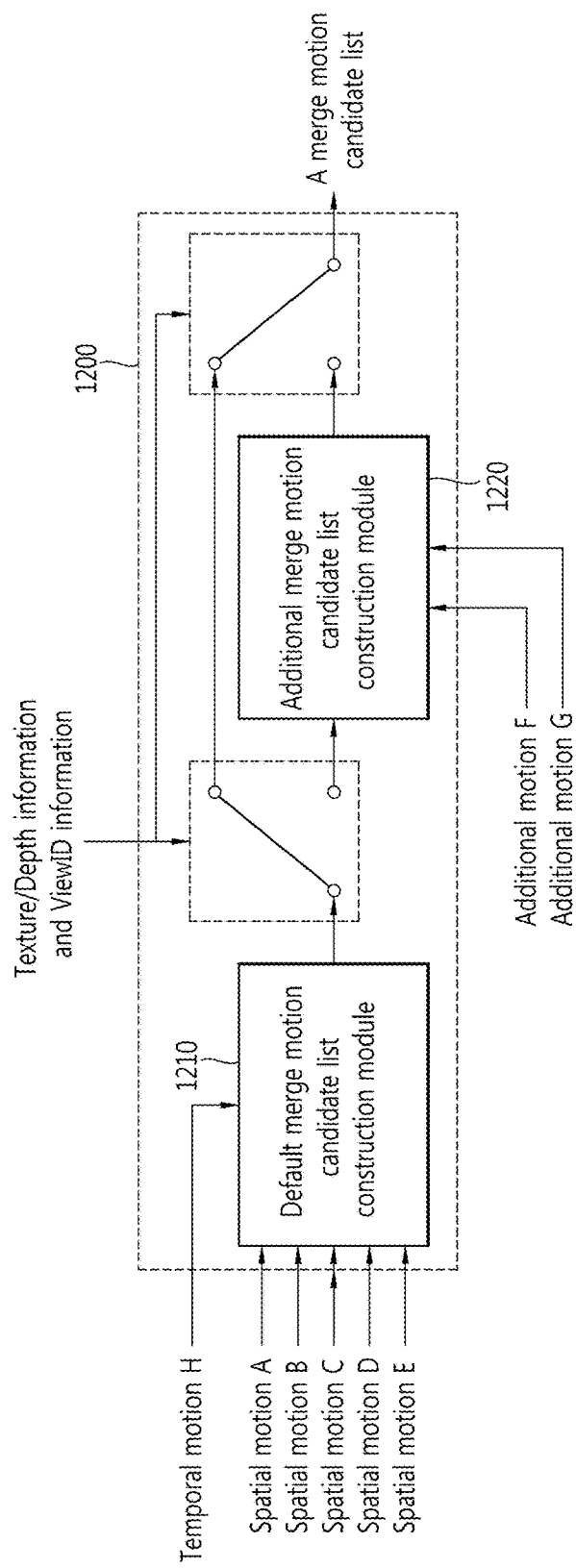
FIG. 12 is one example of a method for merge motion of FIG. 11 according to one embodiment of the present invention implemented by hardware.

FIG. 12 is one example of a method for merge motion of FIG. 11 according to one embodiment of the present invention implemented by hardware.

With reference to FIG. 12, an apparatus carrying out a merge motion method according to one embodiment of the present invention (hereinafter, it is called a merge motion apparatus) 1200 comprises a default merge motion list construction module 1210 and an additional merge motion list construction module 1220.

Input to the merge motion apparatus 1200 includes a spatial merge motion candidate, a temporal merge motion candidate, and an additional merge motion candidate. Output of the merge motion apparatus 1200 is a default merge motion candidate list in the case of a texture view with respect to an independent viewpoint while it is an extended merge motion candidate list in the case of a texture view and its depth map with respect to a dependent viewpoint.

As described above, an independent view refers to a viewpoint at which images can be encoded independently of other viewpoints and can work as a base view. A dependent view refers to a viewpoint at which images are encoded with reference to the independent view. For the convenience of description, the present invention assumes that the independent view is View 0 and the dependent view includes View 1 and View 2.

A default merge motion list construction module 1210 can construct a default merge motion candidate list by deriving a spatial merge motion candidate and a temporal merge motion candidate with respect to a current PU.

As shown in FIG. 8, a spatial merge motion candidate can be derived from neighboring blocks (A, B, C, D, E) spatially close to the current PU.

The default merge motion list construction module 1210 determines whether neighboring blocks (A, B, C, D, E) are available and determines motion information of available neighboring blocks as a spatial merge motion candidate with respect to the current PU. At the time of determining availability of neighboring blocks (A, B, C, D, E), availability of the neighboring blocks (A, B, C, D, E) can be determined according to a predetermined order or an arbitrary order. For example, the availability can be determined in the order of A, B, C, D, and E.

As shown in FIG. 8, the temporal merge motion candidate can be derived from a co-located block (col block) (H, M) within a co-located picture (col picture) with respect to the current PU. The col block H can be a PU block located in the lower right of a block X' corresponding to the current PU within the col picture. The col block M can be a PU block located in the center of block X' corresponding to the current PU with the col picture.

The default merge motion list construction module 1210 determines whether the col block (H, M) is available and determines motion information of available col blocks as a temporal merge motion candidate with respect to the current PU. At this time, determining availability of col blocks (H, M) can be pursued in the order of H and M block or vice versa.

The additional merge motion list construction module 1220 can construct an extended merge motion candidate list by deriving an additional merge motion candidate with respect to a current PU based on the information about whether the current PU image is a texture view or a depth map (Texture/Depth information) and viewpoint information about the current PU (ViewID information).

In case the current PU image is a texture view and its depth map with respect to a dependent view (for example, View 1 and View 2), the additional merge motion list construction module 1220 can additionally carry out a process for constructing a merge motion candidate list for a text view and its depth map with respect to the dependent view of the current PU.

At this time, the input to the additional merge motion list construction module 1220 comprises a default merge motion candidate list constructed by the default merge motion list construction module 1210 and an additional merge motion candidate (F, G). The output of the additional merge motion list construction module 1220 is the extended merge motion candidate list.

To construct a merge motion candidate list for a texture view and its depth map with respect to the dependent view (for example, the View 1 and the View 2), a merge motion apparatus according to an embodiment of the present invention, as described in detail above, can reduce complexity of hardware implementation by implementing only an additional part module instead of implementing a new module. In other words, the present invention reuses a "merge motion candidate list construction" module for the base layer (for example, a texture view with respect to the View 0), implementation of which has been already completed in the form of a hardware chip, to apply the module to the enhancement layer (for example, a texture view and its depth map with respect to the View 1 and the View 2), thereby reducing complexity of hardware implementation.

Figure 13:
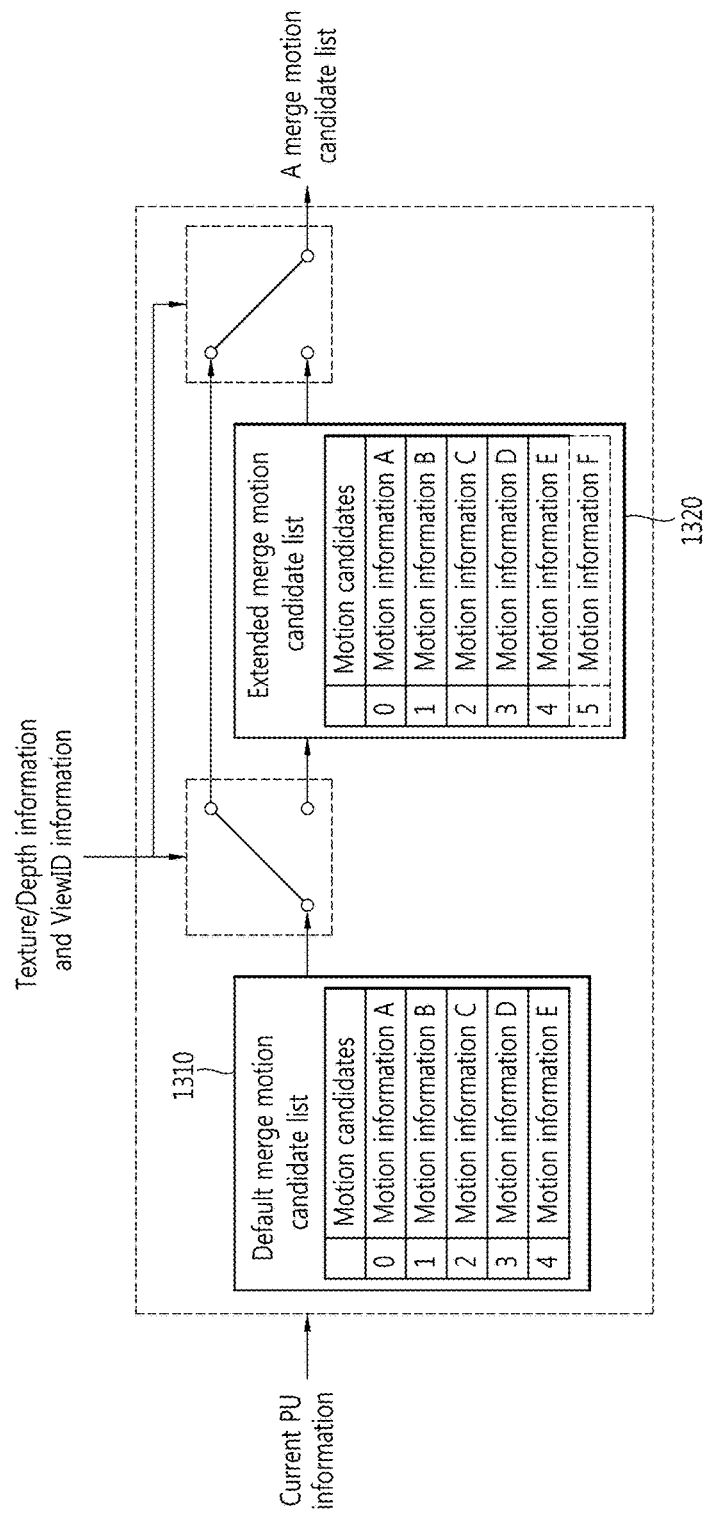
FIG. 13 is a conceptual diagram illustrating a method for constructing a merge motion candidate list of FIGS. 11 and 12 according to one embodiment of the present invention.

FIG. 13 is a conceptual diagram illustrating a method for constructing a merge motion candidate list of FIGS. 11 and 12 according to one embodiment of the present invention. A merge motion candidate list construction method of FIG. 13 can be carried out in the 3D video codec of FIG. 10 or in the merge motion apparatus of FIG. 12.

With reference to FIG. 13, to construct a merge motion candidate list according to an embodiment of the present invention, the input comprises current PU information, information about whether the current PU image is a texture view or a depth map (texture/depth information), and viewpoint information of the current PU (ViewID information); and the output is a merge motion candidate list with respect to the current PU.

First, a default merge motion candidate list 1310 is constructed with respect to the current PU. For example, the default merge motion candidate list can adopt the merge motion candidate list construction method used for the HEVC and as described above, can be constructed based on a spatial merge motion candidate and a temporal merge motion candidate with respect to the current PU.

Next, an extended merge motion candidate list 1320 is constructed based on the information about whether the current PU image is a texture view or its depth map (texture/depth information) and viewpoint information about the current PU image (ViewID information). At this time, the extended merge motion candidate list can be constructed with respect to texture views and the corresponding depth maps of dependent views (for example, View 1 and View 2), and an additional merge motion candidate can be added as described above.

If the current PU is a texture view of an independent view (for example, View 0), a default merge motion candidate list can be produced. On the other hand, if the current PU is texture views and the corresponding depth maps of dependent views (for example, View 1 and View 2), an extended merge motion candidate list can be produced.

At this time, the number of candidates of the extended merge motion candidate list can exceed the number of candidates of the default merge motion candidate list.

Figure 14:
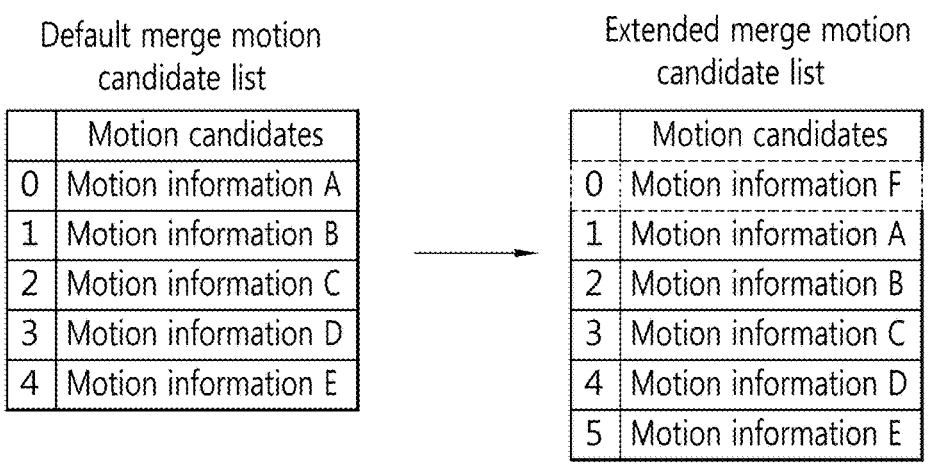
FIG. 14 illustrates a method for constructing an extended merge motion candidate list according to one embodiment of the present invention.

FIG. 14 illustrates a method for constructing an extended merge motion candidate list according to one embodiment of the present invention.

With reference to FIG. 14, an extended merge motion candidate list according to an embodiment of the present invention can insert an additional merge motion candidate, which is additional motion information (for example, motion information F), to the first index (or an index corresponding to an arbitrary position) of the extended merge motion candidate list.

At this time, before an additional merge motion candidate is inserted, the additional merge motion candidate (for example, motion information F) and the first merge motion candidate of the default merge motion candidate list (for example, motion information A) are compared with each other. If the two candidates are not the same with each other, the additional merge motion candidate (the motion information F) can be inserted into the first index of the extended merge motion candidate list and vice versa. For example, at the time of comparing motion information of two candidates (for example, motion information F and A) with each other, if a difference between motion vectors of the two candidates falls below a predetermined threshold, the additional merge motion candidate (for example, motion information F) can be left not inserted into the extended merge motion candidate list and vice versa. Similarly, in case reference images of the two candidates are not the same with each other, the additional merge motion candidate (for example, motion information F) can be inserted into the extended merge motion candidate list and vice versa.

Figure 15:
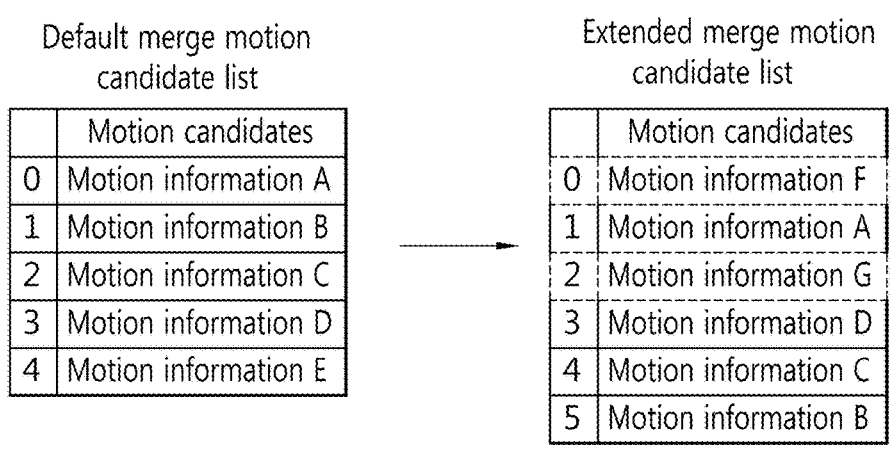
FIG. 15 illustrates a method for constructing an extended merge motion candidate list according to another embodiment of the present invention.

FIG. 15 illustrates a method for constructing an extended merge motion candidate list according to another embodiment of the present invention.

With reference to FIG. 15, an extended merge motion candidate list according to an embodiment of the present invention inserts an additional merge motion candidate (for example, motion information F), which is additional motion information, into the first index of the extended merge motion candidate list and inserts an another additional merge motion candidate (for example, motion information G), which is another additional motion information, into the third index (or an index corresponding to an arbitrary position) of the extended merge motion candidate list.

At this time, before an additional merge motion candidate is inserted, the additional merge motion candidate (for example, motion information F and G) and the original index (the first and the third index) within the default merge motion candidate list are compared with each other. If the two candidates (for example, motion information A and F, or motion information C and G) are not the same with each other, an additional merge motion candidate can be inserted into the first and the third index of the extended merge motion candidate list and vice versa. For example, at the time of comparing motion information of two candidates (for example, motion information A and F, or motion information C and G) with each other, if a difference between motion vectors of the two candidates falls below a predetermined threshold, an additional merge motion candidate (for example, motion information F or G) can be left not inserted into the extended merge motion candidate list and vice versa. Similarly, in case reference images of the two candidates are not the same with each other, the additional merge motion candidate (for example, motion information F or G) can be inserted into the extended merge motion candidate list and vice versa.

[Additional Methods]

The method of FIGS. 10 to 13 can be applied in various ways as described below.

1. As one embodiment, a default encoder (or a default module) can be applied not only to a texture view with respect to View 0 but also texture images and the corresponding depth maps with respect to View 1 and View 2.

2. As another embodiment, the default encoder (or the default module) can be applied only to small block units but with high complexity (for example, 8×8 unit or arbitrary block size). At this time, if texture views and corresponding depth maps with respect to the View 1 and the View 2 are smaller than the small block unit, the default encoder (or default module) is used for encoding, whereas, if they are larger than the small block size, the default encoder (or default module) and a partial encoder (or an extended module) can be used together for encoding. At this time, the default encoder (or default module) can perform the "default merge motion list construction" step of FIGS. 11 and 13 while the partial encoder (or extended module) can perform the "additional merge motion list construction" step of FIGS. 11 and 13.

Figure 16:
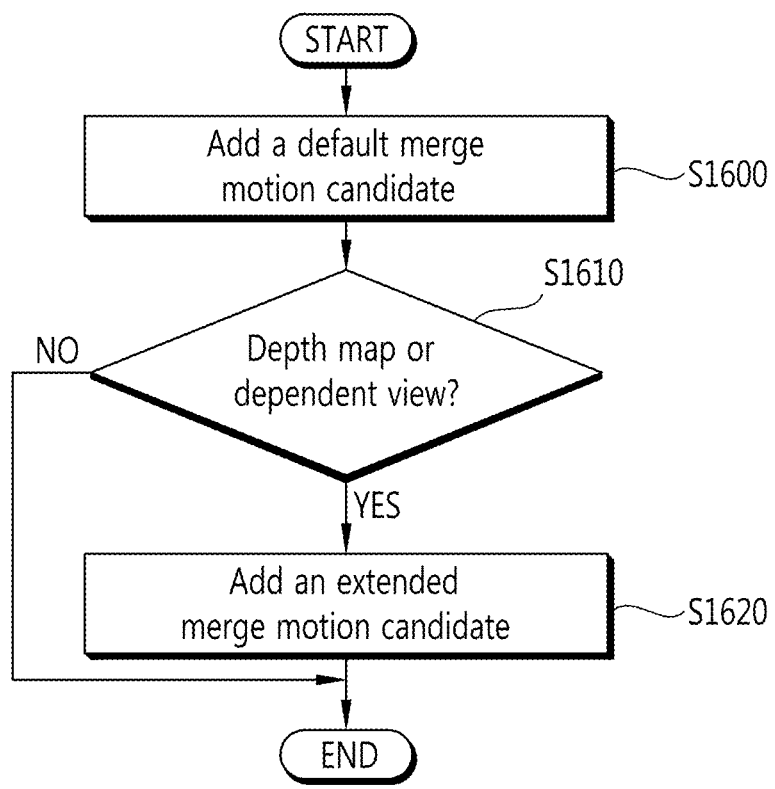
FIG. 16 is a flow diagram briefly illustrating a method for constructing a merge motion candidate list according to one embodiment of the present invention.
Figure 17A:
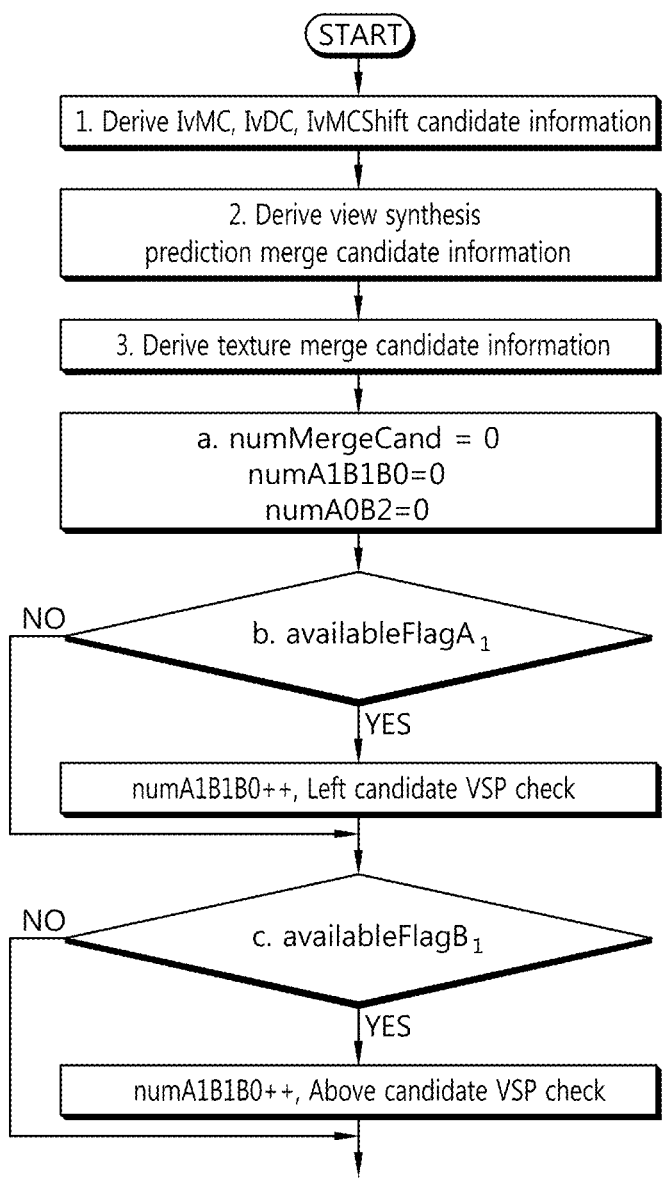
Figure 17B:
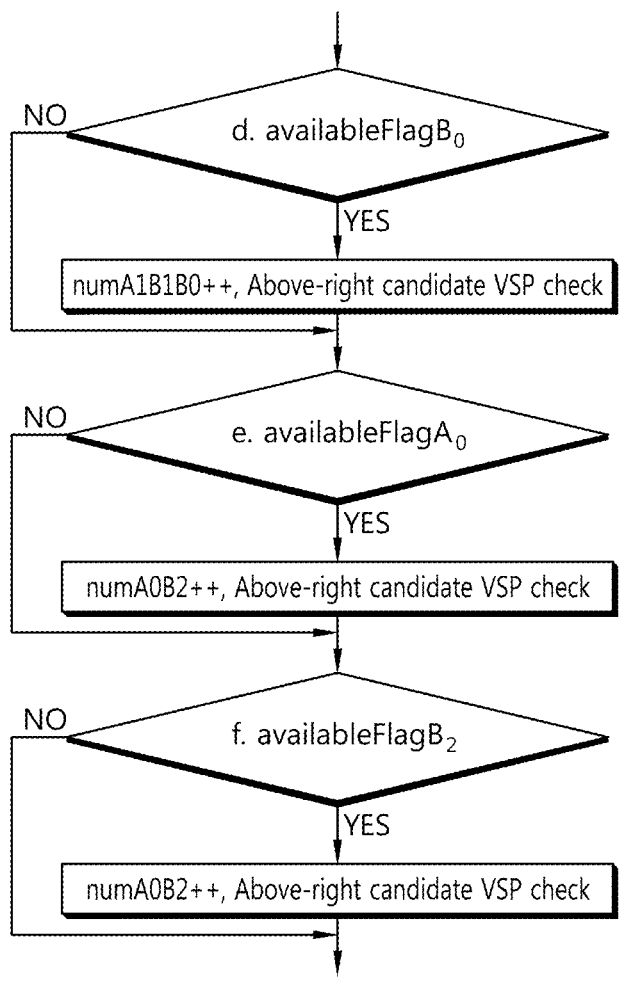
Figure 17C:
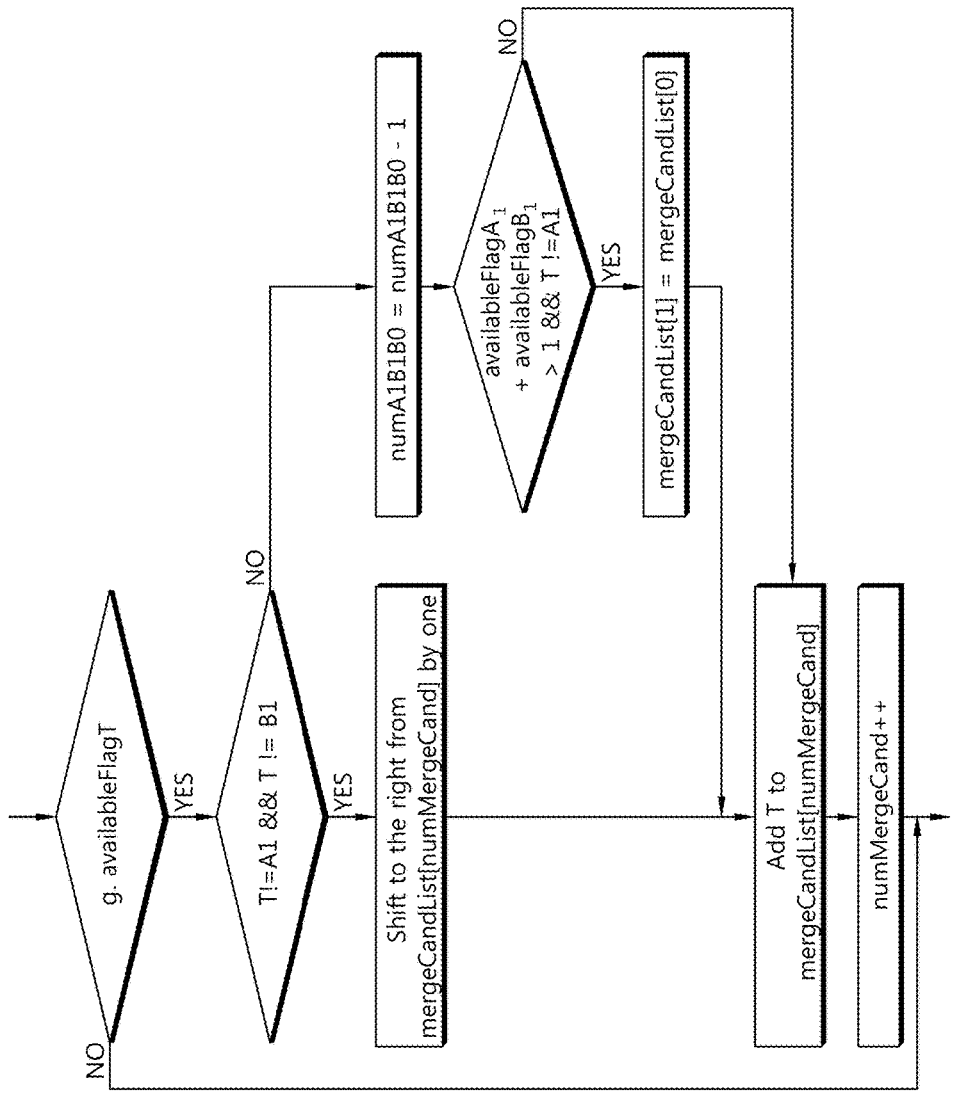
Figure 17E:
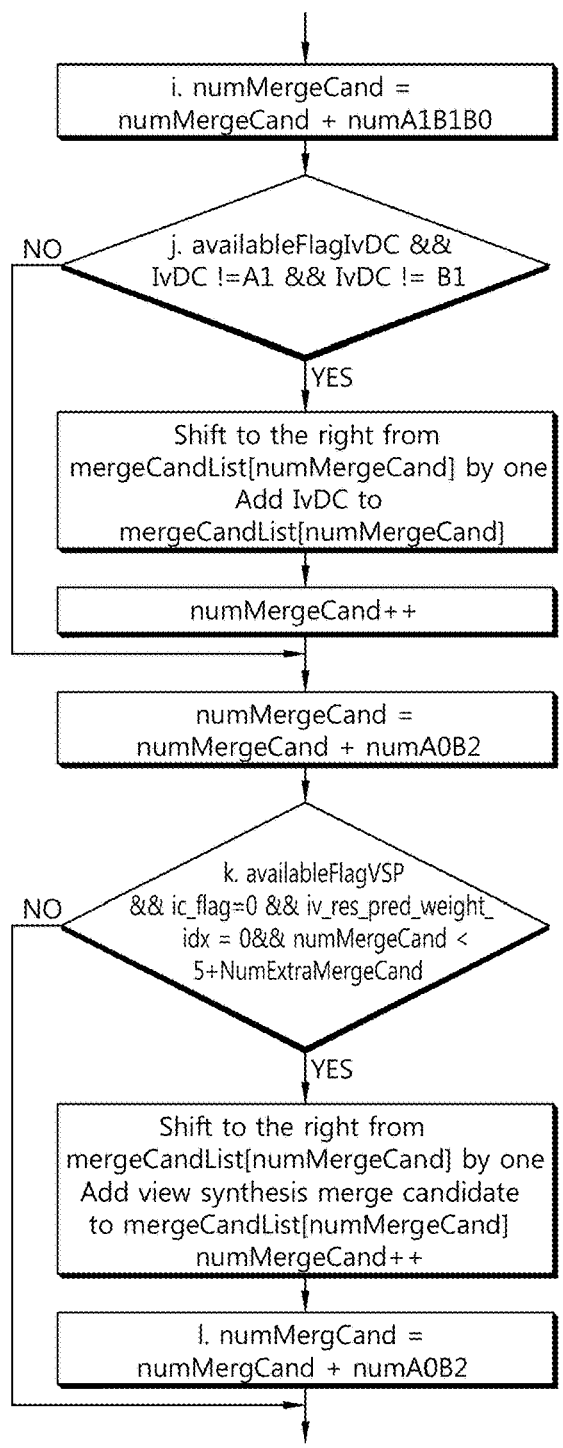
Figure 17F:
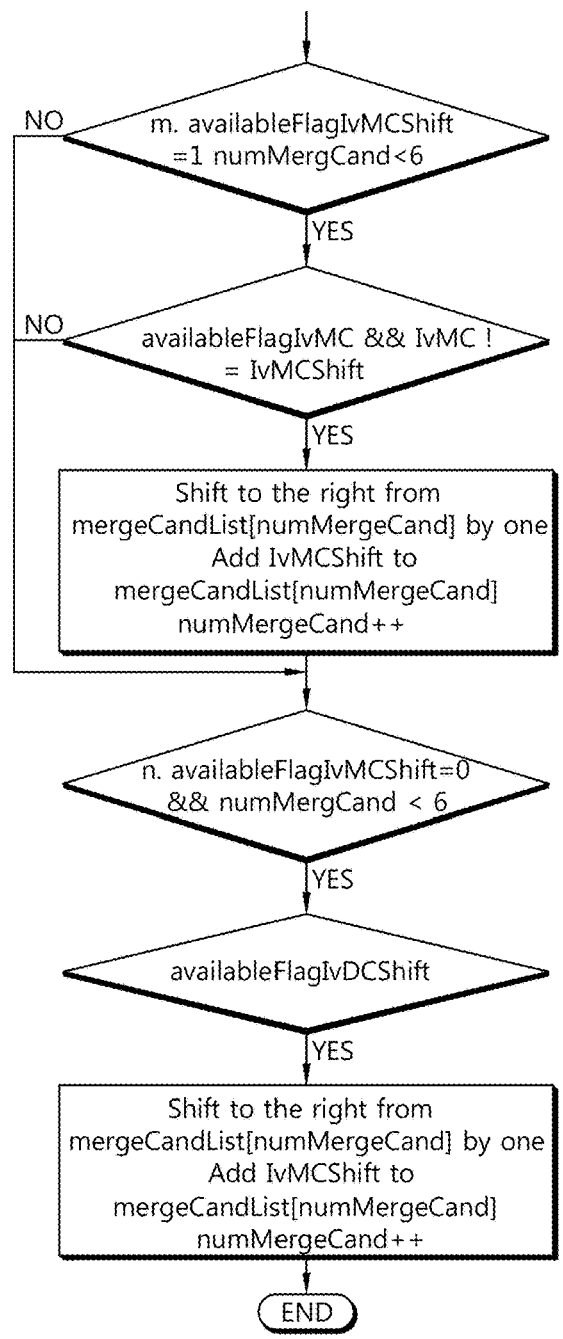

FIG. 16 is a flow diagram briefly illustrating a method for constructing a merge motion candidate list according to one embodiment of the present invention. The method of FIG. 16 can be carried out by an apparatus shown in FIGS. 10 and 12 or carried out after being applied to a 3D-HEVC. For the convenience of description, it is assumed that the method of FIG. 16 is carried out by a merge motion apparatus.

With respect to FIG. 16, a merge motion apparatus adds default merge motion candidates to a merge motion candidate list for a current PU S1600.

At this time, the default merge motion candidates, as described above, can comprise a spatial merge motion candidate and a temporal merge motion candidate with respect to the current PU and can correspond to candidates for texture views of independent views.

The merge motion apparatus determines whether a current picture including the current PU is a depth map or a dependent view S1610.

If the current picture including the current PU is a depth map or a dependent view, the merge motion apparatus adds an extended merge motion candidate to the merge motion candidate list S1620.

At this time, the extended merge motion candidates may correspond to candidates for a depth map or an image of a dependent view (texture view and its depth map).

Tables 1 to 6 show the specifications of Joint Collaborative Team on 3D Video Coding Extensions of ITU-T SG 16 WP 3 and ISO/IEC JTC 1/SC 29/WG 11 (JCT-3V) under development jointly by the Moving Picture Experts Group (MPEG) and Video Coding Experts Group (VCEG).

Table 1 illustrates one example of an input and output of a process including a procedure of adding a default extended merge motion candidate, and Table 2 is one example of an input and output of a process including a procedure of adding an extended merge motion candidate according to an embodiment of the present invention.

TABLE 1

H.8.5.3.2 Derivation process for motion vector components and reference indices

Inputs to this process are:
    a luma location ( xCb, yCb ) of the top-left sample of the current luma coding block relative to the top-left luma sample of the current picture,
    a luma location ( xBl, yBl ) of the top-left sample of the current luma prediction block relative to the top-left sample of the current luma coding block,
    a variable nCbS specifying the size of the current luma coding block,
    two variables nPbW and nPbH specifying the width and the height of the luma prediction block,
    a variable partIdx specifying the index of the current prediction unit within the current coding unit.
Outputs of this process are:
    the luma motion vectors mvL0 and mvL1,
    the chroma motion vectors mvCL0 and mvCL1,
    the reference indices refIdxL0 and refIdxL1,
    the prediction list utilization flags predFlagL0 and predFlagL1.
    the flag subPbMotionFlag, specifying, whether the motion data of the current PU has sub prediction block size motion accuracy.
Let ( xPb, yPb ) specify the top-left sample location of the current luma prediction block relative to the top-left luma sample of the current picture where xPb = xCb + xBl and yPb = yCb + yBl.

TABLE 1-continued

H.8.5.3.2 Derivation process for motion vector components and reference indices Let the variable currPic and ListX be the current picture and RefPicListX, with X being 0 or 1, of the current picture, respectively.
The function LongTermRefPic( aPic, aPb, refIdx, LX ), with X being 0 or 1, is defined as follows:
    If the picture with index refIdx from reference picture list LX of the slice containing prediction block aPb in the picture aPic was marked as "used for long term reference" at the time when aPic was the current picture, LongTermRefPic( aPic, aPb, refIdx, LX ) is equal to 1.
    Otherwise, LongTermRefPic( aPic, aPb, refIdx, LX ) is equal to 0.
The variables vspModeFlag, ivpMvFlagL0, ivpMvFlagL1 and subPbMotionFlag are set equal to 0.
For the derivation of the variables mvL0 and mvL1, refIdxL0 and refIdxL1, as well as predFlagL0 and predFlagL1, the following applies:
    If merge_flag[ xPb ][ yPb ] is equal to 1, the derivation process for luma motion vectors for merge mode as specified in subclause H.8.5.3.2.1 is invoked with the luma location ( xCb, yCb ), the luma location ( xPb, yPb ), the variables nCbS, nPbW, nPbH, and the partition index partIdx as inputs, and the output being the luma motion vectors mvL0, mvL1, the reference indices refIdxL0, refIdxL1, and the prediction list utilization flags predFlagL0 and predFlagL1, the disparity vector availability flags ivpMvFlagL0 and ivpMvFlagL1, the flag vspModeFlag, and the flag subPbMotionFlag.

TABLE 2

H.8.5.3.2 Derivation process for motion vector components and reference indices Inputs to this process are:
    a luma location ( xCb, yCb ) of the top-left sample of the current luma coding block relative to the top-left luma sample of the current picture,
    a luma location ( xBl, yBl ) of the top-left sample of the current luma prediction block relative to the top-left sample of the current luma coding block,
    a variable nCbS specifying the size of the current luma coding block,
    two variables nPbW and nPbH specifying the width and the height of the luma prediction block,
    a variable partIdx specifying the index of the current prediction unit within the current coding unit.
Outputs of this process are:
    the luma motion vectors mvL0 and mvL1,
    the chroma motion vectors mvCL0 and mvCL1,
    the reference indices refIdxL0 and refIdxL1,
    the prediction list utilization flags predFlagL0 and predFlagL1.
    the flag subPbMotionFlag, specifiying, whether the motion data of the current PU has sub prediction block size motion accuracy.
Let ( xPb, yPb ) specify the top-left sample location of the current luma prediction block relative to the top-left luma sample of the current picture where xPb = xCb + xBl and yPb = yCb + yBl.
Let the variable currPic and ListX be the current picture and RefPicListX, with X being 0 or 1, of the current picture, respectively.
The function LongTermRefPic( aPic, aPb, refIdx, LX), with X being 0 or 1, is defined as follows:
    If the picture with index refIdx from reference picture list LX of the slice containing prediction block aPb in the picture aPic was marked as "used for long tem reference" at the time when aPic was the current picture, LongTermRefPic( aPic, aPb, refIdx, LX ) is equal to 1.
    Otherwise, LongTermRefPic( aPic, aPb, refIdx, LX ) is equal to 0.
The variables vspModeFlag, ivpMvFlagL0, ivpMvFlagL1 and subPbMotionFlag are set equal to 0.
For the derivation of the variables mvL0 and mvL1, refIdxL0 and refIdxL1, as well as predFlagL0 and predFlagL1, the following applies:
    If merge_flag[ xPb ][ yPb ] is equal to 1, the following applies:
        The derivation process for base luma motion vectors for merge mode as specified in subclause H.8.5.3.2.17 is invoked with the luma location ( xCb, yCb ), the luma location ( xPb, yPb ), the variables nCbS, nPbW, nPbH, and the partition index partIdx as inputs, and the output being the luma motion vectors mvL0, mvL1, the reference indices refIdxL0, refIdxL1, and the prediction list utilization flags predFlagL0 and predFlagL1, the additional output parameters being the merge candidate lists mergeCandList, the availability flags availableFlagN of the neighbouring prediction units (with N being replaced by A0, A1, B0, B1 or B2).
        If DepthFlag is equal to 1 or ViewIdx is not equal to 0, the derivation process for luma motion vectors for merge mode as specified in subclause H.8.5.3.2.1 is invoked with the luma location ( xCb, yCb ), the luma location ( xPb, yPb ), the variables nCbS, nPbW, nPbH, and the partition index partIdx, the merge candidate lists mergeCandList, the availability flags availableFlagN of the neighbouring prediction units (with N being replaced by $A_0, A_1, B_0, B_1$ or $B_2$) as inputs, and the output being the luma motion vectors mvL0, mvL1, the reference indices refIdxL0, refIdxL1, and the prediction list utilization flags predFlagL0 and predFlagL1, the disparity vector availability flags ivpMvFlagL0 and ivpMvFlagL1, the flag vspModeFlag, and the flag subPbMotionFlag.

The procedure of adding extended merge motion candidates shown in Table 2 according to an embodiment of the present invention uses as additional inputs a merge motion candidate list (megCandList) and a flag (availableFlagN) indicating whether a default merge motion candidate has been added.

In Table 2, N can be replaced with A0, A1, B0, B1, and B2 which represent candidates at left, above, above-right, bottom-left, and above-left position, respectively. In the merge motion candidate list (megCandList) which has received the inputs, default merge motion candidates are stored according to the order of predetermined priorities by an existing method. As one example, the candidates can be stored in the following order: left candidate, above candidate, above-right candidate, bottom-left candidate, above-left candidate, temporal (prediction) candidate, combined bi-predictive candidate, and zero-motion candidate. The output is a merge motion candidate list for which an additional task with respect to extended merge motion candidates has been completed.

Table 3 illustrates an existing procedure of adding an extended merge motion candidate, and Table 4 illustrates a procedure of adding an extended merge motion candidate according to an embodiment of the present invention.

Since Tables 4 describes a process dealing with a list to which default merge motion candidates have already been added, procedures for extended merge motion candidates are only processed. Therefore, in the existing 3D-HEVC, it is possible to omit the process for merge motion candidates which have been used in the HEVC so that the process is not implemented repeatedly.

TABLE 3

| H.8.5.3.2.3 Derivation process for luma motion vectors for merge mode |
|---|

1. The derivation process for merging candidates from neighbouring prediction unit partitions in subclause 8.5.3.2.2 is invoked with the luma coding block location ( xCb, yCb ), the coding block size nCbS, the luma prediction block location ( xPb, yPb ), the luma prediction block width nPbW, the luma prediction block height nPbH, and the partition index partIdx as inputs, and the output being the availability flags availableFlag$A_0$, availableFlag$A_1$, availableFlag$B_0$, availableFlag$B_1$,and available Flag$B_2$, the reference indices refIdxLX$A_0$, refIdxLX$A_1$, refIdxLX$B_0$, refIdxLX$B_1$, and refIdxLX$B_2$, the prediction list utilization flags predFlagLX$A_0$, predFlagLX$A_1$, predFlagLX$B_0$, predFlagLX$B_1$, and predFlagLX$B_2$, and the motion vectors mvLX$A_0$, mvLX$A_1$, mvLX$B_0$, mvLX$B_1$, and mvLX$B_2$, with X being 0 or 1.
2. The reference indices for the temporal merging candidate, refIdxLXCol, with X being 0 or 1, are set equal to 0.
3. The derivation process for temporal luma motion vector prediction in subclause H.8.5.3.2.7 is invoked with the luma location ( xPb, yPb ), the luma prediction block width nPbW, the luma prediction block height nPbH, and the variable refIdxL0Col as inputs, and the output being the availability flag availableFlagL0Col and the temporal motion vector mvL0Col.The variables availableFlagCol, predFlagL0Col and predFlagL1Col are derived as follows:
    availableFlagCol = availableFlagL0Col
    predFlagL0Col = availableFlagL0Col
    predFlagL1Col = 0
4. When slice_type is equal to B, the derivation process for temporal luma motion vector prediction in subclause H.8.5.3.2.7 is invoked with the luma location ( xPb, yPb ), the luma prediction block width nPbW, the luma prediction block height nPbH, and the variable refIdxL1Col as inputs, and the output being the availability flag availableFlagL1Col and the temporal motion vector mvL1Col. The variables availableFlagCol and predFlagL1Col are derived as follows:
    availableFlagCol = availableFlagL0Col || availableFlagL1Col
    predFlagL1Col = availableFlagL1Col
5. Depending on iv_mv_pred_flag[ nuh_layer_id ], the following applies.
    If iv_mv_pred_flag[ nuh_layer_id ] is equal to 0, the flags availableFlagIvMC, availableIvMCShift and availableFlagIvDC are set equal to 0.
    Otherwise (iv_mv_pred_flag[ nuh_layer_id ] is equal to 1), the derivation process for the inter-view merge candidates as specified in subclause H.8.5.3.2.10 is invoked with the luma location ( xPb, yPb ), the variables nPbW and nPbH, as the inputs and the output is assigned to the availability flags availableFlagIvMC, availableIvMCShift and availableFlagIvDC, the reference indices refIdxLXIvMC, refIdxLXIvMCShift and refIdxLXIvDC, the prediction list utilization flags predFlagLXIvMC, predFlagLXivMCShift and predFlagLXIvDC, and the motion vectors mvLXIvMC, mvLXIvMCShift and mvLXIvDC (with X being 0 or 1, respectively)..
6. Depending on view_synthesis_pred_flag[ nuh_layer_id ], the following applies.
    If view_synthesis_pred_flag[ nuh_layer_id ] is equal to 0, the flag availableFlagVSP is set equal to 0.
    Otherwise (view_synthesis_pred_flag[ nuh_layer_id ] is equal to 1), the derivation process for a view synthesis prediction merge candidate as specified in subclause H.8.5.3.2.13 is invoked with the luma locations ( xCb, yCb ) as input and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.
7. Depending on mpi_flag[ nuh_layer_id ], the following applies.
    If mpi_flag[ nuh_layer_id ] is equal to 0, the variable availableFlagT is set equal to 0.
    Otherwise (mpi_flag[ nuh_layer_id ] is equal to 1), the derivation process for the texture merging candidate as specified in subclause H.8.5.3.2.14 is invoked with the luma location ( xPb, yPb ), the variables nPbW and nPbH as the inputs and the outputs are the flag availableFlagT, the prediction utilization flags predFlagL0T and predFlagL1T, the reference indices refIdxL0T and refIdxL1T, and the motion vectors mvL0T and mvL1T.
8. The merge candidate lists mergeCandList and mergeCandIsVspFlag are constructed as specified by the following ordered steps:
    a. The variable numMergeCand is set equal to 0.
    b. When availableFlagT is equal to 1, the entry mergeCandList[ numMergeCand ] is set equal to T. the entry mergeCandIsVspFlag[ numMergeCand ] is set equal to 0 and the variable numMergeCand is increased by 1.

TABLE 3-continued

H.8.5.3.2.3 Derivation process for luma motion vectors for merge mode c.  When availableFlagIvMC is equal to 1,
    When the following condition is true,
        availableFlagT == 0,
    or one or more of the following conditions are true:
        availableFlagT == 1 && predFlagLXT != predFlagLXIcMv
        (with X being replaced by 0 and 1),
        availableFlagT == 1 && mvLXT != mvLXIcMv (with X being
        replaced by 0 and 1),
        availableFlagT == 1 && refIdxLXT != refIdxLXIcMv (with X
        being replaced by 0 and 1),
    the entry mergeCandList[ numMergeCand ] is set equal to IvMC, the entry
    mergeCandIsVspFlag[ numMergeCand ] is set equal to 0 and the variable
    numMergeCand is increased by 1.
d.  When availableFlag$A_1$ is equal to 1, the following applies, with N being replaced
    by ( DepthFlag ? T : IvMC ):
    When the following condition is true,
        availableFlagN == 0,
    or one or more of the following conditions are true:
        availableFlagN == 1 && predFlagLXN != predFlagLX$A_1$, (with X
        being replaced by 0 and 1),
        availableFlagN == 1 && mvLXN != mvLX$A_1$ (with X being
        replaced by 0 and 1),
        availableFlagN == 1 && refIdxLXN != refIdxLX$A_1$ (with X being
        replaced by 0 and 1),
    the entry mergeCandList[ numMergeCand ] is set equal to $A_1$, the entry
    merge CandIsVspFlag[ numMergeCand ] is set equal to
    VspModeFlag[ xPb − 1 ][ yPb + nPbH − 1 ] and the variable
    numMergeCand is increased by 1.
e.  When availableFlag$B_1$ is equal to 1, the following applies, with N being replaced
    by ( DepthFlag ? T : IvMC ):
    When the following condition is true,
        availableFlagN == 0,
    or one or more of the following conditions is true:
        availableFlagN == 1 && predFlagLXN != predFlagLX$B_1$,
        (with X being replaced by 0 and 1),
        availableFlagN == 1 && mvLXN != mvLX$B_1$ (with X being
        replaced by 0 and 1),
        availableFlagN == 1 && refIdxLXN != refIdxLX$B_1$ (with X
        being replaced by 0 and 1),
    the entry mergeCandList[ numMergeCand ] is set equal to $B_1$, the entry
    mergeCandIsVspFlag[ numMergeCand ] is set equal to 0 and the variable
    numMergeCand is increased by 1.
f.  When availableFlag$B_0$ is equal to 1, the entry mergeCandList[ numMergeCand ]
    is set equal to $B_0$, the entry mergeCandIsVspFlag[ numMergeCand ] is set equal
    to 0 and the variable numMergeCand is increased by 1.
g.  When availableFlagIvDC is equal to 1, and one or more of the following
    conditions is true,
        availableFlagA1 == 0,
        predFlagLXA1 != predFlagLXIvDC, (with X being replaced by 0 and 1),
        mvLX$A_1$ != myLXIvDC (with X being replaced by 0 and 1),
        refIdxLX$A_1$ != refIdxLXIvDC (with X being replaced by 0 and 1),
    and one or more of the following conditions is true,
        availableFlag$B_1$ == 0,
        predFlagLX$B_1$ != predFlagLXIvDC, (with X being replaced by 0 and 1),
        mvLX$B_1$ != mvLXIvDC (with X being replaced by 0 and 1),
        refIdxLX$B_1$ != refIdxLXIvDC (with X being replaced by 0 and 1),
    the entry mergeCandList[ numMergeCand ] is set equal to IvDC, the entry
    mergeCandIsVspFlag[ numMergeCand ] is set equal to 0 and the variable
    numMergeCand is increased by 1.
h.  When availableFlagVSP is equal to 1, ic_flag is equal to 0 and
    iv_res_pred_weight_idx is equal to 0, the entry
    mergeCandList[ numMergeCand ] is set equal to VSP, the entry
    mergeCandIsVspFlag[ numMergeCand ] is set equal 1 and the variable
    numMergeCand is increased by 1.
i.  When availableFlag$A_0$ is equal to 1 and numMergeCand is less than 5 +
    NumExtraMergeCand, the entry mergeCandList[ numMergeCand ] is set equal
    to $A_0$, the entry mergeCandIsVspFlag[ numMergeCand ] is set equal to
    VspModeFlag[ xPb − 1 ][ yPb + nPbH ] and the variable numMergeCand is
    increased by 1.
j.  When availableFlag$B_2$ is equal to 1 and numMergeCand is less than
    4 + NumExtraMergeCand, the entry mergeCandList[ numMergeCand ] is set
    equal to $B_2$, the entry mergeCandIsVspFlag[ numMergeCand ] is set equal to 0
    and the variable numMergeCand is increased by 1.

TABLE 3-continued

H.8.5.3.2.3 Derivation process for luma motion vectors for merge mode k.  When availableFlagIvMCShift is equal to 1 and numMergeCand is less than 5 + NumExtraMergeCand, and one or more of the following conditions are true,
        availableFlagIvMC == 0,
        predFlagLXMC != predFlagLXMCShift (with X being replaced by 0 and 1),
        mvLXMC != mvLXIvMCShift (with X being replaced by 0 and 1),
        refIdxLXMC != refIdxLXMCShift (with X being replaced by 0 and 1),
      the entry mergeCandList[ numMergeCand ] is set equal to IvMCShift, the entry mergeCandIsVspFlag[ numMergeCand ] is set equal to 0 and the variable numMergeCand is increased by 1.
    l.  A variable availableFlagIvDCShift is set to 0 and when all of the following conditions are true
        DepthFlag is equal to 0, availableFlagIvMCShift is equal to 0,
        numMergeCand is less than 5 + NumExtraMergeCand,
      the derivation process for the shifted disparity merging candidate as specified in subclause H.8.5.3.2.15 is invoked with the availability flags availableFlagN, the reference indices refIdxL0N and refIdxL1N, the prediction list utilization flags predFlagL0N and predFlagL1N, the motion vectors mvL0N and mvL1N, of every candidate N being in mergeCandList, mergeCandIsVspFlag, and numMergeCand as the inputs and the outputs are the flag availableFlagIvDCShift, the prediction utilization flags predFlagL0IvDCShift and predFlagL1IvDCShift, the reference indices refIdxL0IvDCShift and refIdxL1IvDCShift, and the motion vectors mvL0IvDCShift and mvL1IvDCShift. When availableFlagIvDCShift is equal to 1, the entry mergeCandList[ numMergeCand ] is set equal to IvDCShift, the entry mergeCandIsVspFlag[ numMergeCand ] is set equal to 0 and the variable numMergeCand is increased by 1.
    m.  When availableFlagCol is equal to 1 and numMergeCand is less than 5 + NumExtraMergeCand, the entry mergeCandList[ numMergeCand ] is set equal to Col, the entry mergeCandIsVspFlag[ numMergeCand ] is set equal to 0 and the variable numMergeCand is increased by 1.
9.  The variable numOrigMergeCand is set equal to numMergeCand.
10.  When slice_type is equal to B, the derivation process for combined bi-predictive merging candidates specified in subclause H.8.5.3.2.3 invoked with mergeCandList, mergeCandIsVspFlag, the reference indices refIdxL0N and refIdxL1N, the prediction list utilization flags predFlagL0N and predFlagL1N, the motion vectors mvL0N and mvL1N of every candidate N in mergeCandList, numCurrMergeCand, and numOrigMergeCand as inputs, and the output is assigned to mergeCandList, numCurrMergeCand, the reference indices refIdxL0combCand$_k$ and refIdxL1combCand$_k$, the prediction list utilization flags predFlagL0combCand$_k$ and predFlagL1combCand$_k$, and the motion vectors mvL0combCand$_k$ and mvL1combCand$_k$ of every new candidate combCand$_k$ being added into mergeCandList. The number of candidates being added, numCombMergeCand, is set equal to ( numCurrMergeCand − numOrigMergeCand ). When numCombMergeCand is greater than 0, k ranges from 0 to numCombMergeCand − 1, inclusive, and mergeCandIsVspFlag[ numOrigMergeCand + k ] is set equal to 0.
11.  The derivation process for zero motion vector merging candidates specified in subclause 8.5.3.2.4 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$, and the motion vectors mvL0zeroCand$_m$ and mvL1zeroCand$_m$ of every new candidate zeroCand$_m$ being added into mergeCandList. The number of candidates being added, numZeroMergeCand, is set equal to ( numCurrMergeCand − numOrigMergeCand − numCombMergeCand ). When numZeroMergeCand is greater than 0, m ranges from 0 to numZeroMergeCand − 1, inclusive, and mergeCandIsVspFlag[ numOrigMergeCand + numCombMergeCand + m ] is set equal to 0.

TABLE 4

H.8.5.3.2.3 Derivation process for luma motion vectors for merge mode
1.  Depending on iv_mv_pred_flag[ nuh_layer_id ], the following applies.
    If iv_mv_pred_flag[ nuh_layer_id ] is equal to 0, the flags availableFlagIvMC, availableIvMCShift and availableFlagIvDC are set equal to 0.
    Otherwise (iv_mv_pred_flag[ nuh_layer_id ] is equal to 1), the derivation process for the inter-view merge candidates as specified in subclause H.8.5.3.2.10 is invoked with the luma location ( xPb, yPb ), the variables nPbW and nPbH, as the inputs and the output is assigned to the availability flags availableFlagIvMC, availableIvMCShift and availableFlagIvDC, the reference indices refIdxLXIvMC, refIdxLXIvMCShift and refIdxLXIvDC, the prediction TABLE 4-continued list utilization flags predFlagLXIvMC, predFlagLXivMCShift and predFlagLXIvDC, and the motion vectors mvLXIvMC, mvLXIvMCShift and mvLXIvDC (with X being 0 or 1, respectively)..

2. Depending on view_synthesis_pred_flag[ nuh_layer_id ], the following applies.
   If view_synthesis_pred_flag[ nuh_layer_id ] is equal to 0, the flag availableFlagVSP is set equal to 0.
   Otherwise (view_synthesis_pred_flag[ nuh_layer_id ] is equal to 1), the derivation process for a view synthesis prediction merge candidate as specified in subclause H.8.5.3.2.13 is invoked with the luma locations ( xCb, yCb ) as input and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.

3. Depending on mpi_flag[ nuh_layer_id ], the following applies.
   If mpi_flag[ nuh_layer_id ] is equal to 0, the variable availableFlagT is set equal to 0.
   Otherwise (mpi_flag[ nuh_layer_id ] is equal to 1), the derivation process for the texture merging candidate as specified in subclause H.8.5.3.2.14 is invoked with the luma location ( xPb, yPb ), the variables nPbW and nPbH as the inputs and the outputs are the flag availableFlagT, the prediction utilization flags predFlagL0T and predFlagL1T, the reference indices refIdxL0T and refIdxL1T, and the motion vectors mvL0T and mvL1T.

4. The merge candidate lists mergeCandList and mergeCandIsVspFlag are constructed as specified by the following ordered steps:
   a. The variables numMergeCand,,numA1B1B0, and numA0B2 are set equal to 0.
      When availableFlag$A_1$ is equal to 1, the entry mergeCandIsVspFlag| numA1B1B0 | is set equal to VspModeFlag[ xPb − 1 ][ yPb + nPbH − 1 ] and variable numA1B1B0 is increased by 1.
      When availableFlag$B_1$ is equal to 1, the entry mergeCandIsVspFlag[ numA1B1B0 ] is set equal to VspModeFlag[ xPb + nPbW − 1 ][ yPb − 1 ] and the variable numA1B1B0 is increased by 1.
   d. When availableFlag$B_0$ is equal to 1, the entry mergeCandIsVspFlag[ numA1B1B0 ] is set equal to VspModeFlag[ xPb + nPbW ][ yPb − 1 ] and the variable numA1B1B0 is increased by 1.
   e. When availableFlag$A_0$ is equal to 1, the entry mergeCandIsVspFlag[ numA1B1B0 ] is set equal to VspModeFlag[ xPb − 1 ][ yPb + nPbH ] and the variable numA0B2 is increased by 1.
   f. When availableFlag$B_2$ is equal to 1, the entry mergeCandIsVspFlag[ numA1B1B0 + numA0B2 ] is set equal to VspModeFlag[ xPb − 1 ][ yPb − 1 ] and the variable numA0B2 is increased by 1.
   g. When availableFlagT is equal to 1, the following applies:
      The following applies for N being replaced by A1 and B1:
         The variable pruneFlagN is set equal to 0.
         When all of the following conditions are true,
            availableFlagN == 1,
            predFlagLXN == predFlagLXT, (with X being replaced by 0 and 1),
            mvLXN == mvLXT (with X being replaced by 0 and 1),
            refIdxLXN == refIdxLXT (with X being replaced by 0 and 1),
         pruneFlagN is set equal to 1.
      The variables mergeCandList, MergeCandIsVspFlag, numMergCand and numA1B1B0 are modified as specified in the following:
         Depending on pruneA1Flag and pruneB1Flag, the following applies:
            If pruneFlagA1 is equal to 0 and pruneFlagB1 is equal to 0, the following applies for k in the range of MaxNumMergeCand − 1 to 1, inclusive,
               mergeCandList[ k ] = mergeCandList[ k − 1 ]
               mergeCandIsVspFlag[ k ] = mergeCandIsVspFlag[ k − 1 ]
            Otherwise, the following applies:
               numA1B1B0 = numA1B1B0 − 1
               When availableFlagA1 + availableFlagB1 is greater than 1 and pruneFlagA1 is equal to 0, the following applies:
                  mergeCandList[ 1 ] = mergeCandList[ 0 ]
                  mergeCandIsVspFlag[ 1 ] = mergeCandIsVspFlag[ 0 ]
      The entry mergeCandList[ numMergeCand ] is set equal to T, the entry mergeCandIsVspFlag[ numMergeCand ] is set equal to 0.
      The variable numMergeCand is increased by 1.
   h. When availableFlagIvMC is equal to 1,the following applies:
   The variable pruneFlagA1, pruneFlagB1, pruneFlagT, addIvMC is set equal to 0.
   If DepthFlag is equal to 0, the following applies for N being replaced by A1, B1:
      When all of the following conditions are true,
         availableFlagNe followin
         predFlagLXNagNe following conditions are true,1,
         B1:pplies:Flag[ numM TABLE 4-continued mvLXNlagLXNagNe following conditions are true,1, B1:ppli
        refIdxLXNXNagNe following conditions are true,1, B1:pplies:Flag[
    pruneFlagN is set equal to 1.
Otherwise, if DepthFlag is equal to 1, following applies:
    When all of the following conditions is true,
        availableFlagT =following conditions is true, laced by 0 and 1),d
        1),1B1B0 are modified as sp
        availableFlagT =following conditions is true, laced by 0 and 1),d
        1),1B1B0 are mo
        availableFlagT =following conditions is true,dxLXIvMC (with X being
        replaced by 0 and 1),
    pruneFlagT is set equal to 1.
    The variables mergeCandList, MergeCandIsVspFlag, numMergCand and
    numA1B1B0 are modified as specified in the following:
        Depending on pruneA1Flag and pruneB1Flag, and pruneFlagT, the
        following applies:
            If pruneFlagA1 is equal to 0 and pruneFlagB1 is equal to 0, and
            pruneFlagT is equal to 0, the following applies for k in the range of
            MaxNumMergeCand e 1 to numMergeCand + 1, inclusive,
                addIvMC = 1
                mergeCandList[and + 1, inclusive,pr k − 1 ]
                mergeCandIsVspFlag[ 1, inclusive,pruneFlagB1 is equal
        Otherwise, if DepthFlag is equal to 0 and one of the following
        conditions is true,
            pruneFlagA1 == 1,
            pruneFlagB1 == 1,
        the following applies:
            numA1B1B0 = numA1B1B0 g i
            addIvMC = 1
            When availableFlagA10 g is equal to 0 and one of the following
            conditions is true, is
                mergeCandList[ 1 ] is set equal to mergeCandList[ 0 ],
                mergeCandIsVspFlag[ 1 ] is set equal to
                mergeCandIsVspFlag[ 0 ].
    If addIvMC is equal to 1, the following applies:
        The entry mergeCandList[ numMergeCand ] is set equal to IvMC,
        the entry mergeCandIsVspFlag[ numMergeCand ] is set equal to 0.
        The variable numMergeCand is increased by 1.
    The variable numMergeCand is set equal to numMergeCand +
    numA1B1B0.
j.    When availableFlagIvDC is equal to 1, and one or more of the following
    conditions is true,
    availableFlagA1 == 0,
    predFlagLXA1 != predFlagLXIvDC (with X being replaced by 0 and 1),
    mvLXA$_1$ != mvLXIvDC (with X being replaced by 0 and 1),
    refIdxLXA$_1$ != refIdxLXIvDC (with X being replaced by 0 and 1),
and one or more of the following conditions is true,
    availableFlagB$_1$ == 0,
    predFlagLXB$_1$ != predFlagLXIvDC (with X being replaced by 0 and 1),
    mvLXB$_1$ != mvLXIvDC (with X being replaced by 0 and 1),
    refIdxLXB$_1$ != refIdxLXIvDC (with X being replaced by 0 and 1),
k ranges from MaxNumMergeCand − 1 to numMergeCand + 1, inclusive, and
mergeCandList[ k ] is set equal to mergeCandList[ k − 1 ],
mergeCandIsVspFlag[ k ] is set equal to mergeCandIsVspFlag[ k − 1 ], the entry
mergeCandList[ numMergeCand ] is set equal to IvDC, the entry
mergeCandIsVspFlag[ numMergeCand ] is set equal to 0 and the variable
numMergeCand is increased by 1.
k.    When availableFlagVSP is equal to 1, ic_flag is equal to 0 and
    iv_res_pred_weight_idx is equal to 0 and numMergeCand is less than 5 +
    NumExtraMergeCand, k ranges from MaxNumMergeCand − 1 to
    numMergeCand + 1, inclusive, and mergeCandList[ k ] is set equal to
    mergeCandList[ k − 1 ], mergeCandIsVspFlag[ k ] is set equal to
    mergeCandIsVspFlag[ k − 1 ], the entry mergeCandList[ numMergeCand ]
    is set equal to VSP, the entry mergeCandIsVspFlag[ numMergeCand ] is set
    equal 1 and the variable numMergeCand is increased by 1.
l.    The variable numMergeCand is set equal to numMergeCand + numA0B2.
m.    When availableFlagIvMCShift is equal to 1 and numMergeCand is less than
    5 + NumExtraMergeCand, and one or more of the following conditions are
    true,
    availableFlagIvMC == 0,
    predFlagLXMC != predFlagLXMCShift (with X being replaced by 0 and
    1),
    mvLXMC != mvLXIvMCShift (with X being replaced by 0 and 1),
    refIdxLXMC != refIdxLXMCShift (with X being replaced by 0 and 1),
k ranges from MaxNumMergeCand − 1 to numMergeCand + 1, inclusive, and
mergeCandList[ k ] is set equal to mergeCandList[ k − 1 ],
mergeCandIsVspFlag[ k ] is set equal to mergeCandIsVspFlag[ k − 1 ], the entry
mergeCandList[ numMergeCand ] is set equal to IvMCShift, the entry
mergeCandIsVspFlag[ numMergeCand ] is set equal to 0.

TABLE 4-continued n. A variable availableFlagIvDCShift is set to 0 and when all of the following conditions are true
 DepthFlag is equal to 0,
 availableFlagIvMCShift is equal to 0,
 numMergeCand is less than 5 + NumExtraMergeCand,
the derivation process for the shifted disparity merging candidate as specified in subclause H.8.5.3.2.15 is invoked with the availability flags availableFlagN, the reference indices refIdxL0N and refIdxL1N, the prediction list utilization flags predFlagL0N and predFlagL1N, the motion vectors mvL0N and mvL1N, of every candidate N being in mergeCandList, mergeCandList, mergeCandIsVspFlag, and numMergeCand as the inputs and the outputs are the flag availableFlagIvDCShift, the prediction utilization flags predFlagL0IvDCShift and predFlagL1IvDCShift, the reference indices refIdxL0IvDCShift and refIdxL1IvDCShift, and the motion vectors mvL0IvDCShift and mvL1IvDCShift. When availableFlagIvDCShift is equal to 1, k ranges from MaxNumMergeCand − 1 to numMergeCand + 1, inclusive, and mergeCandList[ k ] is set equal to mergeCandList[ k − 1 ], mergeCandIsVspFlag[ k ] is set equal to mergeCandIsVspFlag[ k − 1 ], the entry mergeCandList[ numMergeCand ] is set equal to IvDCShift, the entry mergeCandIsVspFlag[ numMergeCand ] is set equal to 0 and the variable numMergeCand is increased by 1.

H.8.5.3.2.17 Derivation process for base luma motion vectors for merge mode
The specifications in subclause 8.5.3.2.1 apply, with the following changes:
The following paragraph
 "When slice_type is equal to B, the derivation process for combined bi-predictive merging candidates" is replaced by "When slice_type is equal to B and numMergeCand is less than 5, the derivation process for combined bi-predictive merging candidates"
 "temporal luma motion vector prediction in subclause 8.5.3.2.7 is invoked" is replaced by "temporal luma motion vector prediction in subclause H.8.5.2.3.7 is invoked"

In a procedure of adding an extended merge motion candidate of Table 4 according to an embodiment of the present invention, at the time of deriving a combined bi-predictive candidate, instead of using an existing method for using extended merge motion candidates additionally, the present invention uses a derivation method based on combining only the default merge motion candidates used in the HEVC standard, thereby obtaining almost the same encoding efficiency while reducing computational complexity of the existing method.

The procedure of adding an extended merge motion candidate of Table 4 according to an embodiment of the present invention will be described more specifically with reference to FIGS. 17a to 17f.

FIGS. 17a to 17f are flow diagrams illustrating a method for adding extended merge motion candidates to a merge motion candidate list according to one embodiment of the present invention.

The method of FIGS. 17a to 17f is based on the process of adding extended merge motion candidates of Table 4. The method of FIG. 17a to 17f can be carried out by an apparatus of FIGS. 10 and 12, or can be carried out being applied to the 3D-HEVC.

1. The flag iv_mv_pred_flag[nuh_layer_id] indicates whether a current PU is able to perform inter-view prediction. If the flag iv_mv_pred_flag[nuh_layer_id] is 1, availability of an Inter-view Merge Candidate (IvMC), Inter-view Disparity merge Candidate (IvDC), and shifted Inter-view Merge Candidate (IvMShift); the candidates are stored in the respective flags, availableFlagIvMC, availableIvMCShift, and availableFlagIvDC; and motion information of available candidates is derived.

2. The flag view_synthesis_pred_flag[nuh_layer_id] indicates whether a current PU is able to perform view synthesis prediction. If the flag view_synthesis_pred_flag[nuh_layer_id] is 1, availability of an inter-view synthesis merge candidate is stored in the flag availableFlagVSP, and motion information is derived if the candidate is available.

3. The flag mpi_flag[nuh_layer_id] indicates that a current PU is a depth map and whether motion can be predicted from a texture block. If the flag mpi_flag[nuh_layer_id] is 1, availability of a texture merge candidate is stored in the flag availableFlagT, and motion information is derived if the candidate is available.

4. A merge motion candidate list mergeCandList comprising only default merge motion candidates and inter-view prediction flags mergeCandIsVspFlag for the respective candidates are reconstructed according to the procedure below.

a. numMergeCand represents a total number of merge motion candidates; numA1B1B0 represents the number of candidates in the left, above, and above-right position among default merge motion candidates; and numA0B2 represents the number of candidates in the bottom-left and above-left position among the default merge motion candidates. numMergeCand, numA1B1B0, and numA0B2 are initialized to 0.

b. It is determined whether the left candidate A1 is available. If the left candidate is available, numA1B1B0 is increased by 1. Also, whether the left candidate has used View Synthesis Prediction (hereinafter, VSP) is stored in a flag.

c. It is determined whether the top candidate B1 is available. If the top candidate is available, numA1B1B0 is increased by 1. Also, whether the top candidate has used VSP is stored in a flag.

d. It is determined whether the above-right candidate B0 is available. If the above-right candidate is available, numA1B1B0 is increased by 1. Also, whether the above-right candidate has used VSP is stored in a flag.

e. It is determined whether the bottom-left candidate A0 is available. If the bottom-left candidate is available, numA0B2 is increased by 1. Also, whether the bottom-left candidate has used VSP is stored in a flag.

f. It is determined whether the above-left candidate B2 is available. If the above-left candidate is available, numA0B2 is increased by 1. Also, whether the above-left candidate has used VSP is stored in a flag.

g. If the flag availableFlagT is 1, the following process is carried out.

pruneFlagA1 and pruneFlagB1 are set to 0.

If the left candidate is available and motion information of a texture candidate is the same as that of the left candidate, pruneFlagA1 is set to 1.

If the top candidate is available and motion information of a texture candidate is the same as that of the top candidate, pruneFlagB1 is set to 1.

if pruneFlagA1 and pruneFlagB1 are both 0, a new space is allocated at numMergeCand position of the list. At this time, allocating a new space is equal to shifting all of the values from the numMergeCand position within the list to the right by one cell.

For other cases, the following process is carried out numA1B1B0 is decreased by 1.

If the left and top candidate are all available and pruneFlagA1 is 0, the second value of the list is set to the first value.

The first value of the list is set as a texture candidate and numMergeCand is increased by 1.

h. If the flag availableFlagIvMC is 1, the following process is carried out.

pruneFlagA1, pruneFlagB1, pruneFlagT, and addIvMC are set to 0.

If a current picture is texture (DepthFlag=1), the following process is carried out.

If the left candidate is available and motion information of an inter-view candidate is the same as that of the left candidate, pruneFlagA1 is set to 1.

If the top candidate is available and motion information of an inter-view candidate is the same as that of the top candidate, pruneFlagB1 is set to 1.

If a current picture is a depth map (DepthFlag=0); a texture candidate is available; and motion information of an inter-view candidate is the same as that of the texture candidate, pruneFlagT is set to 1.

If all of the pruneFlagA1, pruneFlagB1, and pruneFlagT are 0, a new space is allocated at numMergeCand position of the list and addIvMC is set to 1.

On the other hand, if a current picture is texture (DepthFlag=0) and motion information of an inter-view candidate is the same as that of the left or top candidate, the following process is carried out.

numA1B1B0 is decreased by 1.

addIvMC is set to 1.

If the left and the top candidate are all available and pruneFlagA1 is 0, the second value of the list is set to the first value thereof.

If addIvMC is 1, the first value of the list is set as a texture candidate and numMergeCand is increased by 1.

i. numA1B1B0 is added to numMergeCand.

j. If the flag availableFlagIvDC is 1, the following process is carried out.

Motion information of an inter-view disparity merge candidate (IvDC) is compared with that of the left and the top candidate available. As a result, if the motion information of the inter-view merge candidate is different from both of the left and the top candidate, a new space is allocated at numMergeCand position of the merge list, and the inter-view disparity merge candidate (IvDC) is added there.

numMergeCand is increased by 1.

k. If the flag availableFlagVSP is 1; intensity compensation flag (ic_flag) is 0; a residual error signal prediction index (iv_res_pred_weight_idx) is 0; and numMergeCand is smaller than 5+number of additional merge candidates NumExtraMergeCand, view synthesis merge candidates are added to the list, and numMergeCand3DV and numMergeCand are increased by 1.

l. numA0B2 is added to numMergeCand.

m. If the flag availableFlagIvMCShift is 1 and numMergeCand is smaller than the maximum length of the list (for example, 6), the following process is carried out.

If an inter-view merge candidate (IvMC) is available, the inter-view merge candidate is compared with a shifted inter-view merge candidate (IvMCShift). If the two candidates are different from each other, a new space is allocated at numMergeCand position of the list, and the shifted inter-view merge candidate is added there.

numMergeCand is increased by 1.

n. If the flag availableFlagIvMCShift is 0; a current PU is not on a depth map; and numMergeCand is smaller than the maximum length of the list (for example, 6), the following process is carried out.

If the shifted inter-view disparity prediction candidate (IvDCShift) is available, a new space is allocated at numMergeCand position of the list, and the shifted inter-view merge candidate is added there.

numMergeCand is increased by 1.

In the step of h and j, when an inter-view merge candidate and an inter-view disparity merge candidate are compared with existing candidates of the list, all of the candidates within the list are not necessarily involved in the comparison to reduce complexity. As one example, only the left and the top candidate may be used for the comparison.

Table 5 illustrates one example of an existing process for deriving combined bi-predictive candidates. Table 6 illustrates one example of reusing a process for deriving HEVC combined bi-predictive candidates in the 3D-HEVC according to an embodiment of the present invention.

TABLE 5

| H.8.5.3.2.3 Derivation process for combined bi-predictive merging candidates |
|---|
| Inputs to this process are:<br>a merging candidate list mergeCandList,<br>a list mergeCandIsVspFlag,<br>the reference indices refIdxL0N and refIdxL1N of every candidate N in mergeCandList,<br>the prediction list utilization flags predFlagL0N and predFlagL1N of every candidate N in mergeCandList,<br>the motion vectors mvL0N and mvL1N of every candidate N in mergeCandList,<br>the number of elements numCurrMergeCand within mergeCandList,<br>the number of elements numOrigMergeCand within the mergeCandList after the spatial and temporal merge candidate derivation process. |

TABLE 5-continued

H.8.5.3.2.3 Derivation process for combined bi-predictive merging candidates

Outputs of this process are:
the merging candidate list mergeCandList,
the number of elements numCurrMergeCand within mergeCandList,
the reference indices refIdxL0combCandk and refIdxL1combCandk of every new candidate
combCandk added into mergeCandList during the invocation of this process,
the prediction list utilization flags predFlagL0combCandk and predFlagL1combCandk of every new
candidate combCandk added into mergeCandList during the invocation of this process,
the motion vectors mvL0combCandk and mvL1combCandk of every new candidate combCandk
added into mergeCandList during the invocation of this process.
When numOrigMergeCand is greater than 1 and less than MaxNumMergeCand, the variable
numInputMergeCand is set equal to numCurrMergeCand, the variable combIdx is set equal to 0, the
variable combStop is set equal to FALSE, and the following steps are repeated until combStop is
equal to TRUE:
    5. The variables l0CandIdx and l1CandIdx are derived using combIdx as specified in Table 8-6.
    6. The following assignments are made, with l0Cand being the candidate at position l0CandIdx
       and l1Cand being the candidate at position l1CandIdx in the merging candidate list
       mergeCandList:
          l0Cand = mergeCandList[ l0CandIdx ]
          l1Cand = mergeCandList[ l1CandIdx ]
    7. When all of the following conditions are true:
       mergeCandIsVspFlag[ l0CandIdx ] = = 0,
       mergeCandIsVspFlag[ l1CandIdx ] = = 0,
       predFlagL0l0Cand = = 1
       predFlagL1l1Cand = = 1
       ( DiffPicOrderCnt( RefPicList0[ refIdxL0l0Cand ], RefPicList1[ refIdxL1l1Cand ] ) != 0
       ) || ( mvL0l0Cand != mvL1l1Cand )
       the candidate combCand$_k$ with k equal to ( numCurrMergeCand − numInputMergeCand ) is
       added at the end of mergeCandList, i.e. mergeCandList[ numCurrMergeCand ] is set equal to
       combCand$_k$, and the reference indices, the prediction list utilization flags, and the motion
       vectors of combCand$_k$ are derived as follows and numCurrMergeCand is incremented by 1:
          refIdxL0combCand$_k$ = refIdxL0l0Cand
          refIdxL1combCand$_k$ = refIdxL1l1Cand
          predFlagL0combCand$_k$ = 1
          predFlagL1combCand$_k$ = 1
          mvL0combCand$_k$[ 0 ] = mvL0l0Cand[ 0 ]
          mvL0combCand$_k$[ 1 ] = mvL0l0Cand[ 1 ]
          mvL1combCand$_k$[ 0 ] = mvL1l1Cand[ 0 ]
          mvL1combCand$_k$[ 1 ] = mvL1l1Cand[ 1 ]
          numCurrMergeCand = numCurrMergeCand + 1
    8. The variable combIdx is incremented by 1.
When combIdx is equal to (cremented by 1.and is incremented by 1:− 1 ) ) or
numCurrMergeCand is equal to MaxNumMergeCand, combStop is set equal to TRUE.

TABLE 6

H.8.5.3.2.17 Derivation process for base luma motion vectors for merge mode

"When slice_type is equal to B, the derivation process for combined bi-predictive merging candidates" is replaced by "When slice_type is equal to B and numMergeCand is less than 5, the derivation process for combined bi-predictive merging candidates"

In the process for deriving combined bi-predictive candidates of Table 6 according to an embodiment of the present invention reuses the process of an existing HEVC rather than build a new module only for a dependent view or a depth map as in Table 5. Therefore, the method shown in Table 6 completely removes the process of Table 5.

Implementation of a process for deriving combined bi-predictive candidates of Table 6 according to an embodiment of the present invention gives a result as shown in Table 7. The video sequences of Table 7 used in an experiment are the ones officially approved in the JCT-3V standardization.

Table 7 shows a comparison result of encoding efficiency and encoding time between an existing method (method of Table 5) and the proposed method of the present invention (method of Table 6).

TABLE 7

|  | View 0 | View 1 | View 2 | video PSNR/ video bitrate | synth PSNR/ total bitrate |
|---|---|---|---|---|---|
| Balloons | 0.0% | 0.0% | 0.2% | 0.0% | 0.0% |
| Kendo | 0.0% | 0.1% | 0.0% | 0.0% | 0.1% |
| Newspaper_CC | 0.0% | 0.0% | 0.1% | 0.0% | 0.0% |
| GT_Fly | 0.0% | 0.0% | −0.1% | 0.0% | 0.0% |
| Poznan_Hall2 | 0.0% | 0.1% | 0.2% | 0.0% | −0.1% |
| Poznan_Street | 0.0% | 0.0% | −0.2% | 0.0% | 0.0% |
| Undo_Dancer | 0.0% | 0.0% | −0.2% | 0.0% | 0.1% |
| 1024 × 768 | 0.0% | 0.0% | 0.1% | 0.0% | 0.0% |
| 1920 × 1088 | 0.0% | 0.0% | −0.1% | 0.0% | 0.0% |
| average | 0.0% | 0.0% | 0.0% | 0.0% | 0.0% |
| Shark | 0.0% | −0.2% | 0.1% | 0.0% | 0.0% |

As shown in Table 7, even though the 3D-HEVC according to an embodiment of the present invention has reused the process for deriving combined bi-predictive candidates in the HEVC, the comparison result shows that increase of PSNR-to-bitrate gain ratio is less than 0.1% compared with an existing method, revealing almost the same encoding efficiency.

The method described in detail above can adopt High Efficiency Video Coding (HEVC) standard, which is being developed jointly by the Moving Picture Experts Group (MPEG)과 the Video Coding Experts Group (VCEG). Therefore, application range of the method above can vary according to the block size, Coding Unit (CU) depth, or Transform Unit (TU) depth, as in the example of Table 8.

The parameter (namely, size of depth information) which determines the application range can be so configured that an encoder and a decoder use a predetermined value or use a value determined according to a profile or a level; or if an encoder specifies a parameter value in a bit stream, the corresponding decoder uses the value by obtaining it from the bit stream. As shown in Table 8, when the application range varies according to the CU depth, the method can be applied in three different ways: A) the method is applied only for depth larger than a given value; B) the method is applied only for depth smaller than the given value; and C) the method is applied only for the given depth.

According to Table 8, in case a given CU (or TU) depth is 2, methods of the present invention can be applied. In Table 8, the "O" mark indicates application to the corresponding depth, and the "X" mark indicates non-application to the corresponding depth.

TABLE 8

| Cu (or PU or TU) depth representing application range | Method A | Method B | Method C |
|---|---|---|---|
| 0 | X | O | X |
| 1 | X | O | X |
| 2 | O | O | O |
| 3 | O | X | X |
| 4 or more | O | X | X |

When it comes to the case that the methods according to the present invention are not to be applied for the whole range of depth, an arbitrary flag may be introduced to indicate the case, or the case may be indicated by signaling the CU depth by using a value representing the application range larger than the maximum CU depth by one.

As additional characteristics of the present invention, application of the methods of the present invention can be signaled being included in a bit stream. For example, information about application of the methods of the present invention can be signaled being included in the syntax of a Sequence Parameter Set (SPS), a Picture Parameter Set (PPS), and a slice header.

Table 9 illustrates one example of a method for signaling application of the methods of the present invention by using the SPS.

TABLE 9

| seq_parameter_set_rbsp( ) { | Descriptor |
|---|---|
| profile_idc | u(8) |
| reserved_zero_8bits /* equal to 0 */ | u(8) |
| level_idc | u(8) |
| ... | ue(v) |
| reuse_enabled_flag | u(1) |
| if(reuse _enabled_flag) | |
|    reuse_disabled_info | ue(v) |
| ... | |

Table 10 illustrates one example of a method for signaling application of the methods of the present invention by using the PPS.

TABLE 10

| pic_parameter_set_rbsp( ) { | Descriptor |
|---|---|
| pic_parameter_set_id | ue(v) |
| seq_parameter_set_id | ue(v) |

TABLE 10-continued

| pic_parameter_set_rbsp( ) { | Descriptor |
|---|---|
| entropy_coding_mode_flag | u(1) |
| ... | |
| reuse_enabled_flag | u(1) |
| if(reuse _enabled_flag) | |
|    reuse_disabled_info | ue(v) |
| ... | |

Table 11 illustrates one example of a method for signaling application of the methods of the present invention by using the slice header.

TABLE 11

| slice_header( ) { | Descriptor |
|---|---|
| slice_type | ue(v) |
| pic_parameter_set_id | ue(v) |
| frame_num | u(v) |
| ... | |
| reuse_enabled_flag | u(1) |
| if(reuse _enabled_flag) | |
|    reuse_disabled_info | ue(v) |
| ... | |

Table 12 illustrates another example of a method for signaling application of the methods of the present invention by using the slice header.

TABLE 12

| slice_header( ) { | Descriptor |
|---|---|
| lightweight_slice_flag | u(1) |
| if( !lightweight_slice_flag ) { | |
|    slice_type | ue(v) |
|    pic_parameter_set_id | ue(v) |
|    frame_num | u(v) |
|    ... | |
| } | |
| if( entropy_coding_mode_flag && slice_type != I) | |
|    cabac_init_idc | ue(v) |
| first_slice_in_pic_flag | u(1) |
| ... | |
| reuse_enabled_flag | u(1) |
| if(reuse _enabled_flag) | |
|    reuse_disabled_info | ue(v) |
| ... | |

In Tables 9 to 12, "reuse_enabled_flag" indicates application of the methods of the present invention. At this time, in case the methods of the present invention are applied, "reuse_enabled_flag" becomes '1' while, in case the methods of the present invention are not applied, "reuse_enabled_flag" becomes '0', and vice versa.

"reuse_disabled_info" is activated when the methods of the present invention are applied (or when "reuse_enabled_flag" is true), which indicates application of the methods of the present invention according to the CU depth (or CU size, macro block size, sub-macro block size, or block size).

As one example, in case "reuse_disabled_infor" is "0", methods of the present invention can be applied to all of the possible block sizes. In case "reuse_disabled_info" is "1", the methods of the present invention can be applied only to the block units, the size of which is larger than a 4×4 block.

As another example, in case "reuse_disabled_info" is "2", the methods of the present invention can be applied only to the block units, the size of which is larger than a 8×8 block. Or the opposite of the example is also possible. For example, in case "reuse_disabled_info" is "1", the methods of the present invention can be applied only to the block units, the size of which is smaller than a 4×4 block. Therefore, syntax of "reuse_disabled_info" can be applied in various ways.

By using the syntax, application of the methods can be determined in units of a picture (or a frame). Also, the method of the present invention can be applied only to the P picture (or frame), and similarly, the method of the present invention can be applied only to B picture (or frame).

The methods of the present invention can be applied not only to a 3D video codec but also to a scalable video codec. As one example, after an encoding/decoding module used in a base layer of a scalable video codec is applied directly to an enhancement layer, the enhancement layer can be encoded/decoded additionally be using a partial encoding/decoding module. As another example, after a "default merge motion list construction" module used in the base layer of the scalable video codec is applied directly to the enhancement layer and a "default merge motion candidate list" is constructed, the "default merge motion candidate list" can be modified by additionally using an "additional merge motion list construction" module, and an "extended merge motion candidate list" for the enhancement layer can be constructed.

Figure 18:
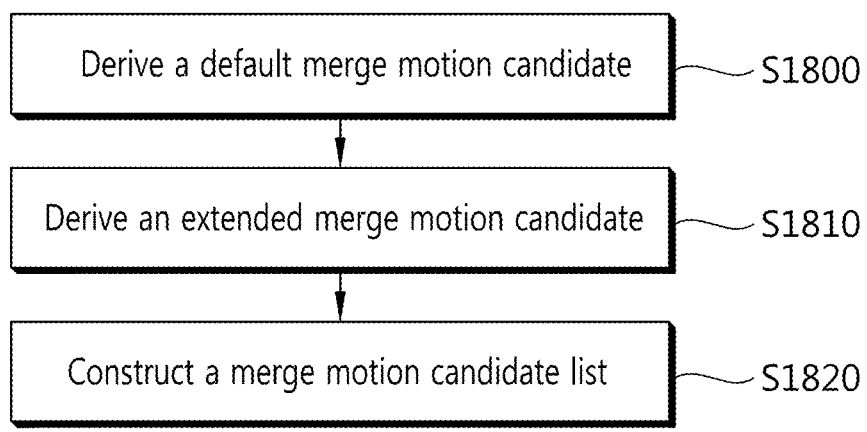
FIG. 18 is a flow diagram briefly illustrating a method for constructing a merge motion candidate list at the time of encoding/decoding a multi-view video according to one embodiment of the present invention.

FIG. 18 is a flow diagram briefly illustrating a method for constructing a merge motion candidate list at the time of encoding/decoding a multi-view video according to one embodiment of the present invention.

The method of FIG. 18 can be carried out by an apparatus of FIG. 10 and FIG. 12, or can be carried out being applied to a 3D-HEVC. For the convenience of description, it is assumed that the method of FIG. 18 is carried out by a merge motion apparatus.

With reference to FIG. 18, the merge motion apparatus derives default merge motion candidates with respect to a current PU and based on the derived default merge motion candidates, constructs a merge motion candidate list S1800.

The default merge motion candidates, as described above, can include spatial merge motion candidates and temporal merge motion candidates with respect to the current PU.

For example, as shown in FIG. 8, the merge motion apparatus can derive a spatial merge motion candidate from at least one block among the left, above, above-right, bottom-left, and above-left block spatially located close to the current PU. And the merge motion apparatus can derive a temporal merge motion candidate from a co-located block within a co-located picture with respect to the current PU (for example, a bottom right block and center block).

The merge motion apparatus, as described above, can construct a merge motion candidate list based on availability of the spatial merge motion candidates and the temporal merge motion candidates.

In case the current PU is a depth map or a dependent view, the merge motion apparatus derives an extended merge motion candidate with respect to the current PU S1810.

The extended merge motion candidate refers to a merge motion candidate used for prediction of a dependent view image or a depth map image. The extended merge motion candidate can include at least one of an Inter-view Merge Candidate (IvMC), a view synthesis prediction merge candidate, and a texture merge candidate.

For example, according to whether the current PU performs inter-view prediction, an IvMC, an Inter-view Disparity merge Candidate (IvDC), a shifted inter-view merge candidate (IvMCShift), and a shifted inter-view disparity merge candidate (IvDCShift). According to whether the current PU performs view synthesis prediction, a view synthesis merge candidate can be derived. According to whether a depth map of the current PU performs motion prediction from a texture block, a texture merge candidate can be derived.

The merge motion apparatus, by adding the derived extended merge motion candidate into a merge motion candidate list, can finally reconstruct a merge motion candidate list S1820.

At this time, in case the extended merge motion candidate to be added is not the same as the default merge motion candidate within the merge motion list, the merge motion apparatus adds the extended merge motion candidate to the merge motion candidate list. The extended merge motion candidate can be added to an arbitrary position within the merge motion candidate list (for example, at the first index of the list).

Also, in case the sum of the number of extended merge motion candidates added to the merge motion candidate list and the number of default merge motion candidates is smaller than the maximum number of candidates of the merge motion candidate list, the merge motion apparatus adds the extended merge motion candidates to the merge motion candidate list.

For example, in case the depth map of the current PU performs motion prediction from a texture block, a texture merge candidate can be derived. At this time, in case a derived texture merge candidate is not the same as the default merge motion candidate within the list, the texture merge candidate can be added to the first index within the merge motion list.

In case the current PU performs inter-view prediction, an IvMC can be derived. At this time, the derived IvMC is not the same as the default merge motion candidate within the merge motion list, the IvMC can be added to the first index within the merge motion list.

In case the current PU performs view synthesis prediction, a view synthesis merge candidate can be derived. At this time, in case the sum of the number of extended merge motion candidates added to the merge motion candidate list and the number of default merge motion candidates is smaller than the maximum number of candidates of the merge motion candidate list, the derived view synthesis merge candidate can be added to the merge motion candidate list.

Since a specific process of adding the extended merge motion candidates to the merge motion candidate list has been already described in detail through the embodiments of the present invention, specific descriptions will not be provided in the present embodiment.

Based on the merge motion candidate list described above, motion information about the current PU can be obtained, and a prediction sample value of the current PU can be obtained by carrying out prediction of the current PU by using the motion information.

Therefore, the encoder can obtain a residual sample value of the current PU based on the prediction sample value of the current PU and transmit the residual sample value to the decoder after performing conversion/quantization and entropy encoding thereof.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

While some exemplary embodiments of the present invention have been described with reference to the accompanying drawings, those skilled in the art may change, modify, and substitute the present invention in various ways without departing from the essential characteristic of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

What is claimed is:

1. A method for video decoding that supports a multi-view, comprising:
   constructing a merge motion candidate list by deriving a default merge motion candidate with respect to a current Prediction Unit (PU);
   deriving an extended merge motion candidate with respect to the current PU in response to the current PU being a depth map or a dependent view; and
   adding the extended merge motion candidate to the merge motion candidate list in response to the extended merge motion candidate not being the same as the default merge motion candidate within the merge motion candidate list,
   wherein the extended merge motion candidate comprises a view synthesis prediction merge candidate that is derived according to whether a view synthesis prediction of the current PU is performed, and
   wherein the adding the extended merge motion candidate comprises adding the view synthesis prediction merge candidate into the merge motion candidate list in response to a sum of a number of extended merge motion candidates already added to the merge motion candidate list and a number of default merge motion candidates being smaller than a maximum number of the merge motion candidate list.

2. The method of claim 1, wherein the extended merge motion candidate is added to an arbitrary position within the merge motion candidate list.

3. The method of claim 1, wherein the default merge motion candidate comprises either one or both of a spatial merge motion candidate and a temporal merge motion candidate of the current PU;
   the spatial merge motion candidate comprises any one block or any combination of any two or more of a left block, an above block, an above-right block, a bottom-left block, and an above-left block located spatially close to the current PU; and
   the temporal merge motion candidate comprises a co-located block within a co-located picture with respect to the current PU.

4. The method of claim 1, wherein the extended merge motion candidate comprises any one or any combination of any two or more of an Inter-view Merge Candidate (IvMC), a view synthesis prediction merge candidate, and a texture merge candidate.

5. The method of claim 4, wherein in the deriving of the extended merge motion candidate, the IvMC is derived according to whether an inter-view prediction of the current PU is performed.

6. The method of claim 4, wherein in the deriving of the extended merge motion candidate, the texture merge candidate is derived according to whether a motion prediction of a depth map of the current PU is performed from a texture block.

7. The method of claim 2, wherein the arbitrary position is a first index within the merge motion candidate list.

8. A method for video decoding that supports a multi-view, comprising:
   constructing a merge motion candidate list by deriving a default merge motion candidate with respect to a current Prediction Unit (PU);
   deriving an extended merge motion candidate with respect to the current PU in response to the current PU being a depth map or a dependent view; and
   adding the extended merge motion candidate to the merge motion candidate list in response to the extended merge motion candidate not being the same as the default merge motion candidate within the merge motion candidate list, wherein in the adding of the extended merge motion candidate, the extended merge motion candidate is added to the merge motion candidate list in response to a sum of a number of the extended merge motion candidates added to the merge motion candidate list and a number of default merge motion candidates being smaller than a maximum number of the merge motion candidate list.

9. The method of claim 6, wherein in response to the motion prediction of the depth map of the current PU being performed from the texture block,
   in the deriving of the extended merge motion candidate, the texture merge candidate is added to a first index within the merge motion candidate list in response to the texture merge candidate not being the same as the default merge motion candidate within the merge motion candidate list.

10. The method of claim 5, wherein in response to the inter-view prediction of the current PU being performed,
    in the adding of the extended merge motion candidate, the IvMC is added to a first index within the merge motion candidate list in response to the IvMC not being the same as the default merge motion candidate within the merge motion candidate list.

11. An apparatus for video decoding that supports a multi-view, comprising:
    a default merge motion list constructor configured to construct a merge motion candidate list by deriving a default merge motion candidate with respect to a current Prediction Unit (PU); and
    an additional merge motion list constructor configured to derive an extended merge motion candidate with respect to the current PU in response to the current PU being a depth map or a dependent view and add the extended merge motion candidate to the merge motion candidate list in response to the extended merge motion candidate not being the same as the default merge motion candidate within the merge motion candidate list,
    wherein the extended merge motion candidate comprises a view synthesis prediction merge candidate that is derived according to whether a view synthesis prediction of the current PU is performed, and
    wherein the view synthesis prediction merge candidate is added into the merge motion candidate list in response to a sum of a number of extended merge motion candidates already added to the merge motion candidate list and a number of default merge motion candidates being smaller than a maximum number of the merge motion candidate list.

12. A method for video encoding that supports a multi-view, comprising:
- constructing a merge motion candidate list by deriving a default merge motion candidate with respect to a current Prediction Unit (PU);
- deriving an extended merge motion candidate with respect to the current PU in response to the current PU being a depth map or a dependent view; and
- adding the extended merge motion candidate to the merge motion candidate list in response to the extended merge motion candidate not being the same as the default merge motion candidate within the merge motion candidate list,
- wherein the extended merge motion candidate comprises a view synthesis prediction merge candidate that is derived according to whether a view synthesis prediction of the current PU is performed, and
- wherein the view synthesis prediction merge candidate is added into the merge motion candidate list in response to a sum of a number of extended merge motion candidates already added to the merge motion candidate list and a number of default merge motion candidates being smaller than a maximum number of the merge motion candidate list.

* * * * *